United States Patent
Saidi et al.

(10) Patent No.: US 7,761,240 B2
(45) Date of Patent: Jul. 20, 2010

(54) SYSTEMS AND METHODS FOR AUTOMATED DIAGNOSIS AND GRADING OF TISSUE IMAGES

(75) Inventors: Olivier Saidi, Greenwich, CT (US); Ali Tabesh, Tucson, AZ (US); Mikhail Teverovskiy, Harrison, NY (US)

(73) Assignee: Aureon Laboratories, Inc., Yonkers, NY (US)

( * ) Notice: Subject to any disclaimer, the term of this patent is extended or adjusted under 35 U.S.C. 154(b) by 1122 days.

(21) Appl. No.: 11/200,758

(22) Filed: Aug. 9, 2005

(65) Prior Publication Data

US 2006/0064248 A1 Mar. 23, 2006

Related U.S. Application Data

(60) Provisional application No. 60/645,158, filed on Jan. 18, 2005, provisional application No. 60/600,764, filed on Aug. 11, 2004.

(51) Int. Cl.
*G06F 19/00* (2006.01)
*G06K 9/00* (2006.01)
*G06K 9/20* (2006.01)
*G06K 9/36* (2006.01)

(52) U.S. Cl. .................. 702/19; 382/128; 382/282; 382/286

(58) Field of Classification Search ............... None
See application file for complete search history.

(56) References Cited

U.S. PATENT DOCUMENTS

| | | | |
|---|---|---|---|
| 4,097,845 A | 6/1978 | Bacus | |
| 5,016,283 A | 5/1991 | Bacus et al. | |
| 5,526,258 A | 6/1996 | Bacus | |
| 5,701,369 A | 12/1997 | Moon et al. | |
| 5,769,074 A | 6/1998 | Barnhill et al. | |
| 6,025,128 A | 2/2000 | Veltri et al. | |
| 6,059,724 A | 5/2000 | Campell et al. | |
| 6,063,026 A | 5/2000 | Schauss et al. | |
| 6,137,899 A | 10/2000 | Lee et al. | |
| 6,317,731 B1 | 11/2001 | Luciano | |
| 6,409,664 B1 | 6/2002 | Kattan et al. | |
| 6,410,043 B1 | 6/2002 | Steiner et al. | |
| 6,413,535 B1 | 7/2002 | Steiner et al. | |
| 6,427,141 B1 | 7/2002 | Barnhill | |
| 6,472,415 B1 | 10/2002 | Sovak et al. | |
| 6,534,266 B1 | 3/2003 | Singer | |
| 6,545,034 B1 | 4/2003 | Carson et al. | |
| 6,545,139 B1 | 4/2003 | Thompson et al. | |
| 6,611,833 B1 | 8/2003 | Johnson | |
| 6,658,395 B1 | 12/2003 | Barnhill | |
| 6,789,069 B1 | 9/2004 | Barnhill et al. | |
| 6,821,767 B1 | 11/2004 | French et al. | |
| 6,828,429 B1 | 12/2004 | Srivastava et al. | |
| 6,906,320 B2 | 6/2005 | Sachs et al. | |
| 6,944,602 B2 | 9/2005 | Cristianini | |
| 6,949,342 B2 | 9/2005 | Golub et al. | |
| 7,052,908 B2 | 5/2006 | Chang | |
| 7,071,303 B2 | 7/2006 | Lin | |
| 7,105,560 B1 | 9/2006 | Carson et al. | |
| 7,105,561 B2 | 9/2006 | Carson et al. | |
| 7,129,262 B2 | 10/2006 | Carson et al. | |
| 7,151,100 B1 | 12/2006 | Carson et al. | |
| 7,189,752 B2 | 3/2007 | Carson et al. | |
| 7,211,599 B2 | 5/2007 | Carson et | |
| 7,229,774 B2 | 6/2007 | Chinnaiyan et al. | |
| 7,245,748 B2 | 7/2007 | Degani et al. | |
| 7,321,881 B2 | 1/2008 | Saidi et al. | |
| 7,332,290 B2 | 2/2008 | Rubin et al. | |
| 7,361,680 B2 | 4/2008 | Carson et al. | |
| 7,393,921 B2 | 7/2008 | Lin | |
| 2001/0036631 A1 | 11/2001 | McGrath et al. | |
| 2002/0086347 A1 | 7/2002 | Johnson et al. | |
| 2002/0165837 A1 | 11/2002 | Zhang et al. | |
| 2002/0196964 A1 | 12/2002 | Stone et al. | |
| 2003/0048931 A1 | 3/2003 | Johnson et al. | |
| 2003/0172043 A1 | 9/2003 | Guyon et al. | |
| 2003/0235816 A1 | 12/2003 | Slawin et al. | |
| 2004/0157255 A1 | 8/2004 | Agus et al. | |

(Continued)

FOREIGN PATENT DOCUMENTS

WO    WO 96/09594    3/1996

OTHER PUBLICATIONS

Ablameyko S., et al. "From cell image segmentation to differential diagnosis of thyroid cancer", Pattern Recognition, 2002. Proceedings. 16th International Conference on Quebec City, Que., Canada Aug. 11-15, 2002, Los Alamitos, CA, USA, IEEE Compout. Soc, US, vol. 1, Aug. 11, 2002, pp. 763-766.

(Continued)

*Primary Examiner*—Lori A Clow
(74) *Attorney, Agent, or Firm*—Mintz, Levin, Cohn, Ferris, Glovsky & Popeo, P.C.

(57) ABSTRACT

Systems and methods are provided for automated diagnosis and grading of tissue images based on morphometric data extracted from the images by a computer. The morphometric data may include image-level morphometric data such as fractal dimension data, fractal code data, wavelet data, and/or color channel histogram data. The morphometric data may also include object-level morphometric data such as color, structural, and/or textural properties of segmented image objects (e.g., stroma, nuclei, red blood cells, etc.).

25 Claims, 19 Drawing Sheets

U.S. PATENT DOCUMENTS

2005/0071300 A1    3/2005    Bartlett et al.

OTHER PUBLICATIONS

M. Antonini, et al., "Image coding using wavelet transform," *IEEE Trans. Image Process.*, vol. 1, pp. 205-220, 1992.

Baatz M., et al., "Multiresolution Segmentation—An Optimization Approach for High Quality Multi-scale Image Segmentation," In *Angewandte Geographische Informationsverarbeitung* XII, Strobl, J., Blaschke, T., Griesebner, G. (eds.), Wichmann—Verlag, Heidelberg, pp. 12-23, 2000.

E. Biganzoli, et al. Feed forward neural networks for the analysis of censored survival data: a partial logistic regression approach. *Stat Med*, 1998.

S.F. Brown, et al. On the use of artificial neural networks for the analysis of survival data. *IEEE Trans. on Neural Networks*, 8(5):1071-1077, 1997.

H.B. Burke, et al. Artificial neural networks improve the accuracy of cancer survival prediction. *Cancer*, 97(4): pp. 857-862, 1997.

Brown, et al. Knowledge-based analysis of microarray gene expression data by using support vector machines. Proc Natl Acad Sci U S A 97:262-7, 2000.

E. Davidow, et al. Advancing drug discovery through systems biology. *Drug Discov Today*, 8:175-183, 2003.

I. Daubechies, *Ten Lectures on Wavelets*, SIAM, Philadelphia, PA, 1992, pp. 198-202 and pp. 254-256.

Definiens Cellenger Architecture: A Technical Review, Apr. 2004.

C.J. S. deSilva, et al. Artificial neural networks and breast cancer prognosis. *Australian Comput J*. 26:78-81, 1994.

J. Diamond, et al., "The use of morphological characteristics and texture analysis in the identification of tissue composition in prostatic neoplasia," *Human Pathology*, vol. 35, pp. 1121-1131, 2004.

R.O. Duda, et al., *Pattern Classification*, $2^{nd}$ ed. Wiley, New York, 2001, pp. 483-484.

Egmont-Petersen M. et al ., "Image Processing with Neural Networks-a-Review", Pattern Recognition, Elsevier, Kidlington, GB, vol. 35, No. 10, Oct. 2002, pp. 2279-2301.

U.M. Fayyad, et al. Knowledge Discovery and Data Mining : Towards a unifying framework. In *Proceedings of the Second International Conference on Knowledge Discovery and Data Mining*, Portland, 1996. AAAI Press.

K. Fukunaga, *Introduction to Statistical Pattern Recognition*, $2^{nd}$ ed. New York: Academic, 1990, p. 125.

Graefen M., et al. International validation of a preoperative nomogram for prostate cancer recurrence after radical prostatectomy. J. Clin Oncol 20:3206-12, 2002.

Graefen M., et al. A validation of two preoperative nomograms predicting recurrence following radical prostatectomy in a cohort of European men. Urol Oncol 7:141-6, 2002.

Graefen, M., et al. Validation study of the accuracy of a postoperative nomogram for recurrence after radical prostatectomy for localized prostate cancer. *Journal of Clin Oncol*, 20:951-956, 2002.

R.C. Gonzales, et al., *Digital Image Processing*. Addison-Wesley, New York, 1992, pp. 173-185.

H. Gronberg. Prostate cancer epidemiology, *Lancet*, 361:859-864, 2003.

Guyon I, et al. Gene selection for cancer classification using support vector machines. Machine Learning 1:S316-22, 2002.

Halabi S, et al. Prognostic model for predicting survival in men with hormone-refractory metastatic prostate cancer. J. Clin Oncol 21:1232-7, 2003.

William S. Harlan, "Optimization of a Neural Network", Feb. 1999 (5 pp.) accessed at http://billharlan.com/pub/papers/neural/ on Mar. 1, 2006.

F.E. Harrell, et al. Evaluating the yield of medical tests. *JAMA*, 247(18):2543-2546, 1982.

F.E. Harrell, Regression Modeling Strategies, Springer-Verlag 2001, pp. 247 and 493.

L. Hood. Systems biology: integrating technology, biology, and computation. *Mech Ageing Dev*, 124:9-16, 2003.

A.E. Jacquin, "Fractal image coding: A review, "0 *Proc. IEEE*, vol. 81, pp. 1451-1465, 1993.

Kaplan E.L., et al. (1958), "nonparametric Estimation from Incomplete Observatinos," JASA, 53, pp. 457-481.

M. W. Kattan, et al. Postoperative nomogram for disease recurrence after radical prostatectomy for prostate cancer. *Journal of Clin Oncol*, 17:1499-1507, 1999.

M.W. Kattan, et al. Experiments to determine whether recursive partitioning or an artificial neural network overcomes theoretical limitation of cox proportional hazards regression. *Comput Biomed Res*, 31(5):363-373, 1998.

M.W. Kattan, et al. ❲A preoperative nomogram for disease recurrence following radical prostatectomy for prostate cancer. J. Natl.Cancer Inst. 90:766-771, 1998.

K. Jafari-Khouzani, et al. "Multiwavelet grading of pathological images of prostate," *IEEE Trans. Biomed. Eng.*, vol. 50, pp. 697-704, 2003.

Kim K.S. et al., "Automatic classification of cells using morphological shape in peripheral blood images", Proceedings of the SPIE—the international society for optical engineering spie-int. soc. Opt. eng USA, vol. 4210, 2000, (290-298 pp).

J.P. Klein, et al. *Survival Analysis: Techniques for Censored and Truncated Data*. Springer, New York, 1997, pp. 247-335.

G. Landini "Applications of fractal geometry in pathology," in *Fractal Geometry in Biological Systems: An Analytical Approach*, P.M. Iannaccone and M. Kohokha, Eds. CRC Press, Boca Raton, FL, 1996, pp. 205-246.

A. Laine, et al., "Texture classification by wavelet packet signatures," *IEEE Trans. Pattern Anal. Machine Intell.*, vol. 15, pp. 1186-1191, 1993.

D.C. Liu, et al. On the limited memory bfgs method for large scale optimization. *Mathematical Programming*, 45:503-528, 1989.

N. Lu, *Fractal Imaging*. Academic, San Diego, CA 1997.

L. Ohno-Machado, et al. Modular neural networks for medical prognosis: Quantifying the benefits of combining neural networks for survival prediction. *Connection Science*, 9:71-86, 1997.

Mohler JL, et al. Nuclear roundness factor measurement for assessment of prognosis of patients with prosatatic carcinoma. I. Testing of a digitization system. J. Urol 139:1080-4, 1988.

Olinici CD, et al. Computer-based image analysis of nucleoli in prostate carcinoma. Rom J. Morphol Embryol 43:163-7, 1997.

E.E. Osuna, et al. Support Vector Machines : Training and Applications. A.I. Memo 1602/C.B.C.L. Paper 144, MIT, 1997.

Partin AW, et al. Use of nuclear morphometry, Gleason histologic scoring, clinical stage, and age predict disease-free survival among patients with prostate cancer. Cancer 70:161-168, 1992.

M.A. Roula, et al., "A multispectral computer vision system for automatic grading of prostatic neoplasia," in *Proc. Proc. IEEE Int. Symp. Biomed. Imaging*, Washington, DC, 2002, pp. 193-196.

Sabino D M U et al., "Toward leukocyte recognition using morphometry, texture and color", Biomedical Imaging: Macro to Nano, 2004. IEEE International Symposium on Arlington VA, USA Apr. 15-18, 2004, Piscataway, NJ USA, IEEE, Apr. 15, 2004, pp. 121-124.

Scher HI, et al. Clinical states in prostate cancer: towards a dynamic model of disease progression. Urology 55:323-327, 2000.

Schoelkopf B. et al., "Comparing Support Vector Machines With Gaussian Kernels to Radial Basis Function Classifiers", IEEE Transactions on Signal Processing, IEEE Service Center, New York, NY, US, vol. 45, No. 11, Nov. 1997, pp. 2758-2765.

B.A.M. Schouten, et al., "Feature extraction using fractal codes," in *Proc. Int. Conf. Visual Information and Information Systems*, Amsterdam, 1999, pp. 483-492.

A. Sloan, "Retrieving database contents by image recognition: New fractal power," *Advanced Imaging*, vol. 5, pp. 26-30, 1994.

Smaletz O, et al., Nomogram for overall survival of patients with progressive metastatic prostate cancer after castration. J. Clin Oncol 20:3972-82, 2002.

Y. Smith, et al., "Similarity measurement method for the classification of architecturally differentiated images," *Comp. Biomed. Res.*, vol. 32, pp. 1-12, 1999.

P. Snow, et al. Artificial neural networks in the diagnosis and prognosis of prostate cancer: a pilot study. *J. Urology*, 152(5):1923-1926, 1997.

Stephenson RA, et al. An image analysis method for assessment of prognostic risk in prostate cancer: a pilot study. Anal Cell Pathol 3:243-8, 1991.

R. Stotzka, et al., "A hybrid neural and statistical classifier system for histopathologic grading of prostate lesions," *Anal. Quant. Cytol. Histol.*, vol. 17, pp. 204-218, 1995.

M. Teverovskiy, et al., "Improved prediction of prostate cancer recurrence base on an automated tissue image analysis system," in Proc. *IEEE Int. Symp. Biomed. Imaging*, Arlington, VA, 2004, pp. 257-260.

Tong, Zhao et al., "A novel scheme for abnormal cell detection in pap smear images". Proceedings of the Spie—The International Society for Optical Engineering SPIE-INT. Soc. Opt. Eng USA, vol. 5318, No. 1, Jul. 2004, pp. 151-162.

Veltri RW, et al. Quantitative nuclear grade (QNG) : a new image analysis-based biomarker of clinically relevant nuclear structure alterations. J Cell Biochem Suppl Suppl 35:151-7, 2000.

Veltri RW, et al., Ability to predict biochemical progression using Gleason score and a computer-generated quantitative nuclear grade derived from cancer cell nuclei. Urology 48:685-91, 1996.

Veltri RW, et al. Quantitative nuclear morphometry, Markovian texture descriptors, and DNA content captured on a CAS-200 Image analysis system, combined with PCNA and HER-2/neuimmunohistochemistry for prediction of prostate cancer progression. J. Cell Biochem Suppl 19:249-58, 1994.

I. Yan, et al., "*Optimizing classifier performance via an approximation function to the Wilcoxon-mann-whitney statistic,*" Proc. of $20^{th}$ *Int'l Conf. Machine Learning*, pp. 848-855, 2003.

Yeh W-C et al., ❰Liver fibrosis grade classification with B-mode ultrasound ❱Ultrasound in Medicine and Biology, New York, NY, US, vol. 29, No. 9 Sep. 2003, pp. 1229-1235.

Wang N., et al. Morphometry of nuclei of the normal and malignant prostate in relation to DNA ploidy. Anal Quant Cytol Histol 14:210-6, 1992.

A.W. Wetzel, et al. "Evaluation of prostate tumor grades by content-based image retrieval," in *Proc. SPIE AIPR Workshop on Advances in Computer-Assisted Recognition*, vol. 3584, Washington, DC, 1999, pp. 244-252.

International Search Report dated Jan. 2, 2006, corresponding to PCT/US2005/028244.

Aaltomaa, S., et al. "Expression of Ki-67, cyclin D1 and apoptosis markers correlated with survival in prostate cancer patients treated by radical prostatectomy" *Anticancer Res*. 2006;26(6C):4873-4878.

Albertsen,..et al PC, . "20-year outcomes following conservative management of clinically localized prostate cancer." *JAMA*. 2005;293(17):2095-2101.

Berry,.. DA, et al. "Estrogen-receptor status and outcomes of modern chemotherapy for patients with node-positive breast cancer." *Jama* 2006;295(14):1658-1667.

Bertrand,..et al PV, . "A quirk in multiple regression: the whole regression can be greater than the sum of its parts." *Statistician*. 1988;37(4/5):371-374.

Bettencourt,..et al MC, . "Ki-67 expression is a prognostic marker of prostate cancer recurrence after radical prostatectomy." *J Urol*. Sep. 1996;156(3):1064-1068.

Bill-Axelson, A, et al. "Radical prostatectomy versus watchful waiting in early prostate cancer". *N Engl J Med*. 2005;352(19):1977-1984.

Bubendorf, L.,, et al. "Ki67 labeling index in core needle biopsies independently predicts tumor-specific survival in prostate cancer". *Hum Pathol*. 1998;29(9):949-954.

Camp, R. L. et al, "Automated subcellular localization and quantification of protein expression in tissue microarrays," *Nature Medicine*, vol. 8;(11), pp. 1323-1327, 2002.

Chen,.. CD, et al. "Molecular determinants of resistance to antiandrogen therapy" Nat Med 2004; 10:33-39.

Churilov, L, et al., "Improving risk grouping rules for prostate cancer patients with optimization", Proceedings of the $37^{th}$ Annual Hawaii International Conference on System Sciences, 2004, pp. 1-9. Digital Object Identifier 10. 1109/HICSS.2004.1265355.

Coleman, K., et al, . "Syntactic structure analysis in uveal melanomas". *Br J Ophthalmol*. 1994;78:871-874.

Cooperberg,.. MR, et al. "The contemporary management of prostate cancer in the United States: lessons from the cancer of the prostate strategic urologic research endeavor (APCapSURE), a national disease registry" J Urol 2004;171:1393-1401.

Office Action corresponding to U.S. Appl. No. 10/991,240, mailed May 28, 2008, 22 pgs.

Cox, D.R., "Regression models and life tables (with discussion)," *Journal of the Royal Statistical Society*, Series B, vol. 34, pp. 187-220, 1972.

Cuzick, J., et al. "Long-term outcome among men with conservatively treated localised prostate cancer." *Br J Cancer*. 2006;95(9):1186-1194.

de la Taille A., et al. ❰Microvessel density as a predictor of PSA recurrence after radical prostatectomy. A comparison of CD34 and CD31. *Am J Clin Pathol*. 2000;113(4):555-562.

Dhanasekaran, S.M., et al. "Delineation of prognostic biomarkers in prostate cancer". Nature 2001;412:822-826.

Eskelinen, M., et al. "Prognostic factors in prostatic adenocarcinoma assessed by means of quantitative histology". Eur Urol 1991;:274-278.

Freedland, S.J., et al. "Risk of prostate cancer-specific mortality following biochemical recurrence after radical prostatectomy". Jama 2005;294:433-439.

Freiha, F.S., et al. Selection criteria for radical prostatectomy based on morphometric studies in prostate carcinoma. NCI Monogr 1988;7: 107-108.

Gonzalgo M.L., et al. "Relationship between primary Gleason pattern on needle biopsy and clinicopathologic outcomes among men with Gleason score 7 adenocarcinoma of the prostate". *Urology*. 2006;67(1):115-119.

Gordon, A., et al, "Single-cell quantification of molecules and rates using open-source microscope-based cytometry," Nature Methods, 2007 vol. 4, pp. 175-181.

Grober E.D., et al. Correlation of the primary Gleason pattern on prostate needle biopsy with clinico-pathological factors in Gleason 7 tumors, Can J Urol. 2004;11(1):2157-2162.

Grossman, M.E., et al. Androgen receptor signaling in androgen-refractory prostate cancer. *J National Cancer Institute*,2001; 93(2):1687-1697.

Halvorsen O.J., et al". Independent prognostic importance of microvessel density in clinically localized prostate cancer". *Anticancer Res*. 2000;20:3791-3799.

Hameed O, et al. "Immunohistochemistry in diagnostic surgical pathology of the prostate". Semin Diagn Pathol 2005;22:88-104.

Harashima K., et al". Heat shock protein 90 (Hsp90) chaperone complex inhibitor, radicicol, potentiated radiation-induced cell killing in a hormone-sensitive prostate cancer cell line through degradation of the androgen receptor". Int J Radiat Biol 2005;81 (1):63-76.

Hoffmann K, et al.; *Mol Biotechnol*. 29:31-38 (2005).

Holmberg L, et al. "A randomized trial comparing radical prostatectomy with watchful waiting in early prostate cancer". *N Engl J Med*. 2002;347(11):781-789.

Huggins C., et al". Studies on prostate cancer: I: The effect of castration, of estrogen and of androgen injection on serum phosphatases in metastatic carcinoma of the prostate". The Journal of Urology, vol. 168, pp. 9-12, Jul. 2002.

Hull, G.W., et al". Cancer control with radical prostatectomy alone in 1,000 consecutive patients". J Urol 2002;167:528-534 Pt 1.

Hurwitz, M.D., et al. 1999. "Nuclear morphometry predicts disease-free interval for clinically localized adenocarcinoma of the prostate treated with definitive radiation therapy". Int J Cancer 199984:594-597.

Ideker, T., et al. "A new approach to decoding life: systems biology". Annu Rev Genomics Hum Genet 2:343-372.(2001).

Inoue, T., et al. "Androgen receptor, Ki67, and p53 expression in radical prostatectomy specimens predict treatment failure in Japanese population". Urology 66:332-337. 2005.

International Search Report dated Dec. 19, 2005, corresponding to PCT/US2005/008350, 1 pg.

International Search Report for PCT/US2004/038778, Mailed Jul. 2, 2008, 1 pg.

International Search Report and Written Opinion issued Mar. 15, 2007 for PCT/US2006/040294, 13 pgs.

Baish, J.W. et al", Fractals and cancer", *Cancer Research*, vol. 60, pp. 3683-3688, 2000.

Johansson,.. JE, et al. "Natural history of early, localized prostate cancer". Jama 2004; 291:2713-2719.

Julious,..et al SA, . "Confounding and Simpson's paradox". *Bmj.* 1994;309(6967):1480-1481.

Khatami A., et al". Is tumor vascularity in prostate core biopsies a predictor of PSA recurrence after radical prostatectomy?" *Acta Oncol.* 2005;44(4):362-368.

Kim J.et al, . "The role of protein kinase A pathway and cAMP responsive element-binding protein in androgen receptor-mediated transcription at the prostate-specific antigen locus". *J Mol Endocrinol.* 2005;34(1):107-118.

Klotz L. "Active surveillance versus radical treatment for favorable-risk localized prostate cancer". *Curr Treat Options Oncol.* 2006;7:355-362.

Kosman D., et al.; *Science*, 305, 846 (2004).

Krtolica, A., et al, "Quantification of epithelial cells in coculture with fibroblast by fluorescence image analysis," Cytometry, vol. 49, pp. 73-82, 2002.

LaTulippe, E., et al.., "Comprehensive gene expression analysis of prostate cancer reveals distinct transcriptional programs associated with metastatic disease". *Cancer Res* 62:4499-4506, 2002.

Lee Y-J, et al. "Breast cancer survival and chemotherapy: a support vector machine analysis". *DIMACS Series in Discrete Mathematics and Theoretical Computer Science.* 2000;55:1-10.

Li, H.,. "Kernel Cox regression models for linking gene expression profiles to censored survival data". *Pac Symp Biocomput* 2003:65-76.

Li, R., et al. "High level of androgen receptor is associated with aggressive clinicopathologic features and decreased biochemical recurrence-free survival in prostate: cancer patients treated with radical prostatectomy". Am J Surg Pathol 28:928-934 (2004).

Lin Y., et al. "Androgen and its receptor promote Bax-mediated apoptosis". Mol Cell Biol 2006;26(5):1908-1916.

Luo, J., et al. "Human prostate cancer and benign prostatic hyperplasia: molecular dissection by gene expression profiling". Cancer Res 61:4683-4688 (2001).

Luo, J.H., et al". Gene expression analysis of prostate cancers". Mol Carcinog 33:25-35 (2002).

Luo, Jun, et al., "α-Methylacyl-CoA Racemase: A new molecular marker for prostate cancer", *Cancer Research*, 62;2220-226, 2002.

Messing E.M., et al". Immediate hormonal therapy compared with observation after radical prostatectomy and pelvic lymphadenectomy in men with node-positive prostate cancer". N. Engl J Med 341(24):1781-1788 (1999).

Messing EM, Thompson I, Jr. Follow-up of conservatively managed prostate cancer: watchful waiting and primary hormonal therapy. Urol Clin North Am 30:687-702, viii4 (2003).

Molinaro, A. et al., Tree-based Multivariate Regression and Density Estimation with Right-Censored Data. University of California, U.C. Berkeley Division of Biostatistics Working Paper Series, 2003, 1-50.

Moul JW, Wu H, Sun L, et al. Early versus delayed hormonal therapy for prostate specific antigen only recurrence of prostate cancer after radical prostatectomy. J Urol 171:1141-73 (2004).

Mucci NR, Rubin MA, Strawderman MS, Montie JE, Smith DC, Pienta KJ. Expression of nuclear antigen Ki-67 in prostate cancer needle biopsy and radical prostatectomy specimens. *J Natl Cancer Inst.* 2000;92(23):1941-1942.

Pasquier, D, et al., MRI alone simulation for conformal radiation therapy of prostate cancer: Technical Aspects, *Engineering in Medicine and Biology Society*, 2006. EMBS 28th Annual International Conference of the IEEE, pp. 160-163.

Pollack A, DeSilvio M, Khor LY, et al. Ki-67 staining is a strong predictor of distant metastasis and mortality for men with prostate cancer treated with radiotherapy plus androgen deprivation: Radiation Therapy Oncology Group Trial 92-02. *J Clin Oncol.* 2004;22(11):2133-2140.

Pouliot, S., et al., Automatic detection of three radio-opaque markers for prostate targeting using EPID during radiation therapy, *Image Proceedings.* 2001 International Conference on vol. 2, 2001 pp. 857-860, Digital Object Identifier 10.1109/ICIP.2001.958629.

Rakotomamonjy, A., Variable Selection Using SVM-based Criteria, J of Machine Learning Research, 2003; (3)1357-1370.

Ramaswamy, S., Ross, K.N., Lander, E.S., and Golub, T.R. 2003. A molecular signature of metastasis in primary solid tumors. Nat Genet 33:49-54 (2003).

Rao, J.Y., D. Seligson, and G. P. Hemstreet, Protein expression analysis using quantitative fluorescence image analysis on tissue microarray slides, BioTechniques, vol. 32:924-932 (2002).

Rhodes, D.R., Barrette, T.R., Rubin, M.A., Ghosh, D., and Chinnaiyan, A.M. 2002. Meta-analysis of microarrays: interstudy validation of gene expression profiles reveals pathway dysregulation in prostate cancer. Cancer Res 62:4427-4433 (2002).

Rubin MA, Bismar TA, Andren O, Mucci L, Kim R, Shen R, Ghosh D, Wei J, Chinnaiyan A, Adami O, Kantoff P, Johansson J-E. Decreased a-methylacyl CoA racemase expression in localized prostate cancer is associated with an increased rate of biochemical recurrence and cancer-specific death. Cancer Epid Bio Prev 2005;14:1424-1432.

Sadi MV, Barrack ER. Androgen receptors and growth fraction in metastatic prostate cancer as predictors of time to tumor progression after hormonal therapy. Cancer Surv 11:195-215 (1991).

Sadi MV, Barrack ER. Image analysis of androgen receptor immunostaining in metastatic prostate cancer. Heterogeneity as a predictor of response to hormonal therapy. Cancer 71:2574-2580 (1993).

Scheipers, U., et al., Ultrasonic multifeature tissue characterization for the early detection of prostate cancer, Ultrasonics Symposium, 2001. IEEE vol. 2 pp. 1265-1268.

Sharifi N, Gulley JL, Dahut WL. Androgen deprivation therapy for prostate cancer. Jama 2005;294:238-442.

Singh, D., Febbo, P.G., Ross, K., Jackson, D.G., Manola, J., Ladd, C., Tamayo, P., Renshaw, A.A., D'Amico, A.V., Richie, J.P., et al. 2002. Gene expression correlates of clinical prostate cancer behavior. Cancer Cell 1:203-209.

Singh, S., et al. Raf kinase inhibitor protein: a putative molecular target in prostate cancer, India Annual Conference, 2004. Proceedings of the IEEE INDICON. 1st, pp. 406-409.

Smaletz O, Scher HI, Small EJ, et al. Nomogram for overall survival of patients with progressive metastatic prostate cancer after castration. *J Clin Oncol.* 2002;20(19):3972-3982.

Smola, A. et al., A Turtorial on Support Vector Regression, NeuroCOLT2 Technical Report Series NCE-TR-1998-030, 1998, 1-73.

Song, Yan, et al., a model-aided segmentation in urethra identification based on an atlas human autopsy image for intesity modulated radiation therapy. *Engineering in Medicine and Biology Society*, 2007. EMBS. 29th Annual International Conference of the IEEE 22-26 pp. 3532-3535.

Stephenson AJ, Scardino PT, Eastham JA, Bianco F, Dotan ZA, Fearn PA, Kattan M. Preoperative nomogram predicting the 10-year probability of prostate cancer recurrence after radical prostatectomy. *J Natl Cancer Inst* 2006 98:715-717.

Stephenson AJ, Scardino PT, Eastham JA, et al. Postoperative nomogram predicting the 10-year probability of prostate cancer recurrence after radical prostatectomy. J Clin Oncol, 23:7005-12 (2005).

Stephenson AJ, Smith A, Kattan MW, et al. Integration of gene expression profiling and clinical variables to predict prostate carcinoma recurrence after radical prostatectomy. Cancer104:290-298 (2005).

Su, A.I., et al. 2001. Molecular classification of human carcinomas by use of gene expression signatures. *Cancer Res* 61:7388-7393.

Sun L, Gancarczyk K, Paquette E, et al. Introduction to Department of Defense Center for Prostate Disease Research Multicenter National Prostate Cancer Database, and analysis of changes in the PSA-era. Urol Oncol 2001;6:203-95.

Swindle P.W., et al., Markers and Meaning of Primary Treatment Failure. Urologic Clinics of North America. 30(2):377-401, May 2003.

Swindle, P., Eastham, J.A., Ohori, M., Kattan, M.W., Wheeler, T., Maru, N., Slawin, K., and Scardino, P.T. 2005. Do margins matter?

The prognostic significance of positive surgical margins in radical prostatectomy specimens. J Urol 174:903-907(2005).

van Diest PJ, Fleege JC, Baak JP. Syntactic structure analysis in invasive breast cancer: analysis of reproducibility, biologic background, and prognostic value. *Hum Pathol*.1992;23(8):876-883.

Ward JF, Blute ML, Slezak J, Bergstralh EJ, Zincke H. The long-term clinical impact of biochemical recurrence of prostate cancer 5 or more years after radical prostatectomy. J. Urol 2003; 170:1872-65.

Welsh, J.B., Sapinoso, L.M., Su, A.I., Kern, S.G., Wang-Rodriguez, J., Moskaluk, C.A., Frierson, H.F., Jr., and Hampton, G.M. 2001. Analysis of gene expression identifies candidate markers and pharmacological targets in prostate cancer. Cancer Res 61:5974-5978 (2001).

Weyn, B. Computer Assisted Dfferenes Computer-Assisted Differential Diagnosis of Malignant Mesothelioma Based on Syntactic Structure Analysis, *Cytometry* 35:23-29 (1999).

Wirth M, Tyrrell C, Delaere K, et al. Bicalutamide ('Casodex') 150 mg in addition to standard care in patients with nonmetastatic prostate cancer: updated results from a randomised double-blind phase III study (median follow-up 5.1 y) in the early prostate cancer programme. Prostate Cancer Prostatic Dis (2005);8:194-200.

Veltri RW, et al., Stromal-epithelial measurements of prostate cancer in native Japanese and Japanese-American men, *Prostate Cancer and Prostatic Diseases* (2004) 7: 232-237.

Vonesch, F. Aguet, J. L. Vonesch, and M. Unser, The colored revolution of bioimaging, *IEEE Signal Proc. Mag.*, vol. 23, No. 3, pp. 20-31, May 2006.

Ye, Q.H., Qin, L.X., Forgues, M., He, P., Kim, J.W., Peng, A.C., Simon, R., Li, Y., Robles, A.I., Chen, Y., et al. 2003. Predicting hepatitis B virus-positive metastatic hepatocellular carcinomas using gene expression profiling and supervised machine learning. Nat Med 9:416-423.

Yeang, C.H., Ramaswamy, S., Tamayo, P., Mukherjee, S., Rifkin, R.M., Angelo, M., Reich, M., Lander, E., Mesirov, J., and Golub, T. 2001. Molecular classification of multiple tumor types. Bioinformatics 17 Suppl 1:S316-322.

Zubek, V.B. et al. Machine Learning and Applications. Proceedings. Fourth Int'l Conference on Dec. 15-17, 2005. Digital Object Identifier 10.1109/ICMLA.2005.14 (6pages).

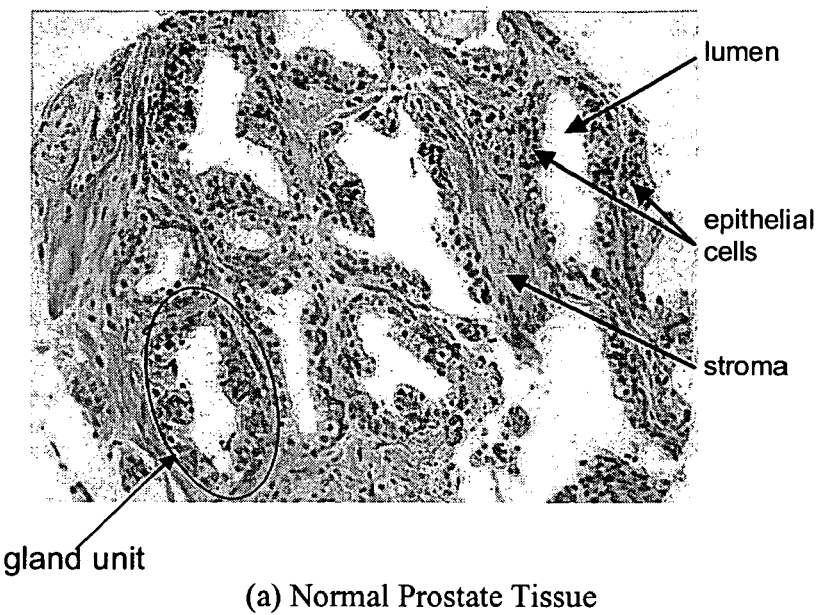
(a) Normal Prostate Tissue
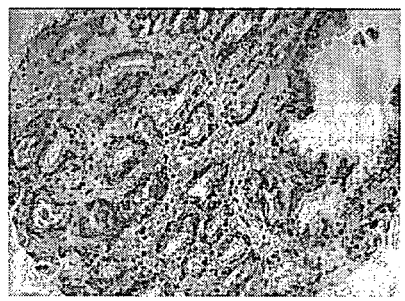
(b) Cancerous Prostate Tissue
(Gleason Grade 2)
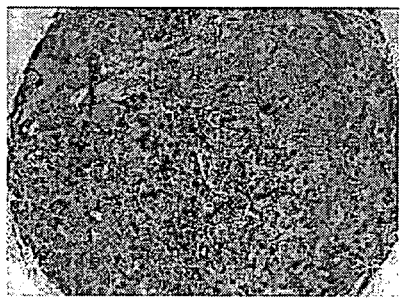
(c) Cancerous Prostate Tissue
(Gleason Grade 5)
FIG. 1

Gleason Grading System

402 Threshold a tissue image at $N_b$ fixed, equally-spaced thresholds in each of its red, green, and blue (RGB) color channels to obtain $3N_b$ binary images

404 Compute a fractal dimension value $\gamma_k^i$ for each binary image $B_k^i$

406 Generate a $3N_b$-dimensional feature vector $\gamma$ from the fractal dimension values

900

Separate a tissue image into each of its red, green and blue (RGB) color channels — 902

↓

Separate each color channel into bins representing various levels of color intensity — 904

↓

Compute pixel counts for the bins — 906

FIG. 9

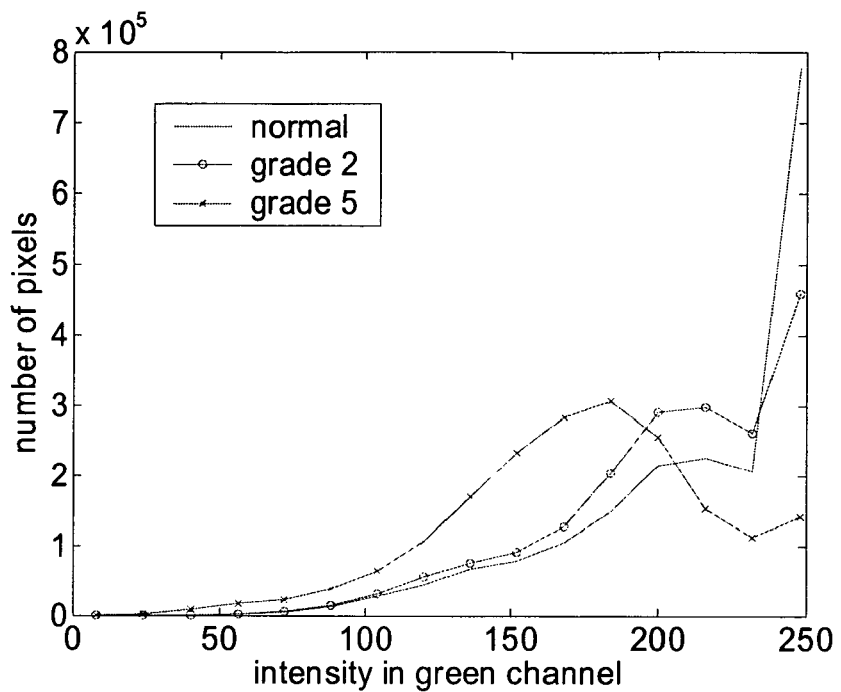
(a)
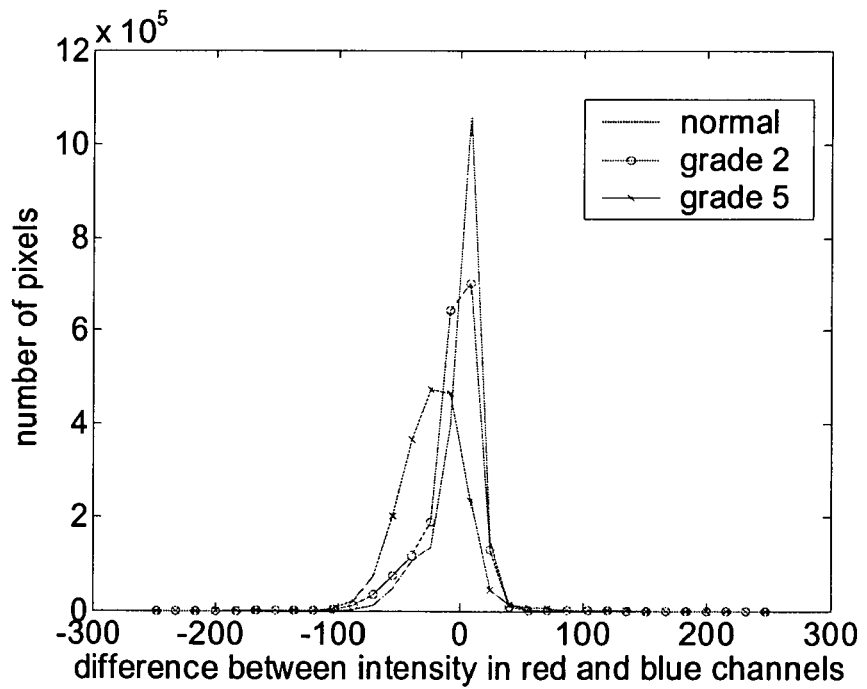
(b)
FIG. 10

1202 Evaluate a first set of morphometric data from a tissue image with a model that predicts whether the tissue is cancerous or non-cancerous
1204 If the model classifies the tissue as cancerous tissue, evaluate a second set of morphometric data from the tissue image with a model that assigns a cancer grade to the tissue
FIG. 12

1324

Facility (e.g., hospital or physician's office)

Test kit including predictive model —1322

FIG. 13(b)

Study 1: Automated Prostate Cancer Diagnosis

| Feature Set | Classifier | Median $n*$ | Accuracy (%) | CI (%) | Sensitivity (%) / Specificity (%) |
|---|---|---|---|---|---|
| Color channel histograms | Linear | 14 | 92.1 | ±2.8 | 91.7 / 92.6 |
| | Quadratic | 12 | 93.5 | ±2.5 | 91.7 / 96.0 |
| Fractal dimension | Linear | 5 | 90.7 | ±3.0 | 92.7 / 87.9 |
| | Quadratic | 6 | 91.3 | ±2.9 | 92.7 / 89.3 |
| Fractal code | Linear | 9 | 89.1 | ±3.2 | 91.3 / 85.9 |
| | Quadratic | 13 | 90.5 | ±3.0 | 90.4 / 90.6 |
| Wavelet | Linear | 7 | 91.3 | ±2.9 | 91.7 / 90.6 |
| | Quadratic | 7 | 89.6 | ±3.1 | 91.7 / 86.6 |
| Object-Level (MAGIC™) | Linear | 7 | 96.7 | ±1.8 | 96.3 / 97.3 |
| | Quadratic | 11 | 95.9 | ±2.0 | 95.4 / 96.6 |
| Combined | Linear | 7 | 95.6 | ±2.1 | 95.4 / 96.0 |
| | Quadratic | 13 | 94.3 | ±2.4 | 95.4 / 92.6 |

| Feature Set | Top Feature | Accuracy (%) |
|---|---|---|
| Color channel histograms | bin 15 of green channel histogram | 86.1 |
| Fractal dimension | bin 10 of green channel | 89.4 |
| Fractal code | bin 16 of MSE histogram | 87.7 |
| Wavelet | variance of lowest resolution diagonal detail subband | 89.4 |
| Object-Level (MAGIC™) | number of epithelial nuclei objects with 1 neighbor | 89.1 |

FIG. 14

Study 2: Automated Gleason Grading

| Feature Set | Classifier | Median n* | Accuracy (%) | CI (%) | Sensitivity (%) / Specificity (%) |
|---|---|---|---|---|---|
| Color channel histograms | Linear | 9 | 63.8 | ±5.8 | 11.8 / 91.4 |
| | Quadratic | 6 | 62.3 | ±5.8 | 11.8 / 89.1 |
| Fractal dimension | Linear | 6 | 72.8 | ±5.3 | 53.8 / 82.9 |
| | Quadratic | 6 | 68.3 | ±5.6 | 49.5 / 78.3 |
| Fractal code | Linear | 5 | 76.9 | ±5.0 | 61.3 / 85.1 |
| | Quadratic | 8 | 71.6 | ±5.4 | 53.8 / 81.1 |
| Wavelet | Linear | 5 | 75.7 | ±5.1 | 60.2 / 84.0 |
| | Quadratic | 4 | 73.5 | ±5.3 | 58.1 / 81.7 |
| MAGIC™ | Linear | 7 | 77.6 | ±5.0 | 65.6 / 84.0 |
| | Quadratic | 7 | 75.7 | ±5.1 | 62.4 / 82.9 |
| Combined | Linear | 7 | 78.7 | ±4.9 | 68.8 / 84.0 |
| | Quadratic | 4 | 77.2 | ±5.0 | 65.6 / 83.4 |

| Feature Set | Top Feature | Accuracy (%) |
|---|---|---|
| Color channel histograms | bin 14 of green channel histogram | 65.3 |
| Fractal dimension | bin 11 of green channel | 73.9 |
| Fractal code | bin 12 of shift parameter histogram | 78.0 |
| Wavelet | variance of approximation subband | 74.3 |
| MAGIC™ | standard deviation of the border length of lumen | 80.2 |

FIG. 16

SYSTEMS AND METHODS FOR AUTOMATED DIAGNOSIS AND GRADING OF TISSUE IMAGES

CROSS-REFERENCE TO RELATED APPLICATIONS

This claims the benefit of U.S. Provisional Patent Application Ser. Nos. 60/600,764, filed Aug. 11, 2004, and 60/645,158, filed Jan. 18, 2005, which are hereby incorporated by reference herein in their entireties.

FIELD OF THE INVENTION

Embodiments of the invention relate to systems and methods for automated diagnosis and grading of tissue images. For example, in one embodiment, the invention provides systems and methods for extracting morphometric data from an image of prostate tissue and evaluating the data to determine whether the tissue is cancerous or non-cancerous. In another embodiment, the invention evaluates the morphometric data to determine a grade of cancer aggressiveness (e.g., a Gleason grade) for the prostate tissue.

BACKGROUND OF THE INVENTION

Prostate cancer is the most prevalent form of cancer and the second most common cause of death among men in the United States. One of the most reliable methods for prostate cancer diagnosis is the examination of the glandular architecture of a prostate tissue specimen under a microscope by a pathologist. For example, FIG. 1(a) shows an image of normal prostate tissue, which consists of gland units surrounded by fibromuscular tissue called "stroma" that holds the gland units together. Each gland unit is made of a row of epithelial cells located around a circularly shaped "hole" in the tissue, named the lumen. When cancer occurs, epithelial cells replicate in an uncontrolled way, thereby disrupting the normal arrangement of the gland units. This causes the lumens to become filled with epithelial cells and the stroma to virtually disappear. FIGS. 1(b) and 1(c) show images of cancerous prostate tissue, where the cancer depicted in FIG. 1(c) is more aggressive than the cancer depicted in FIG. 1(b). The images in FIGS. 1(a)-(c) were originally color images of Hematoxylin-and-Eosin ("H&E") stained tissue cores from a tissue microarray (TMA), but have been depicted in FIG. 1 in grayscale for reproducibility. The inclusion of these images in this Background section is for informational purposes only, and is not an admission of prior art. On the contrary, these images were generated by an image processing system described in commonly-owned U.S. patent Ser. No. 11/080,360, filed Mar. 14, 2005, now U.S. Pat. No. 7,467,119, which is hereby incorporated by reference herein in its entirety.

Pathologists typically quantify cancer aggressiveness through tissue "grading." Tissue grading involves having the pathologist look at an image of prostate tissue and, based on that pathologist's experience and expertise, assigning a grade to the tissue correlating to the aggressiveness of the cancer. Tissue grading is valuable to physicians in several ways. First, it aids with identifying the extent of the disease. Second, cancer grade correlates well with patient survival. Finally, knowledge of cancer grade helps with determining an appropriate treatment option for a patient (e.g., selecting a more aggressive treatment for a patient with a higher cancer grade).

The most common method for grading prostate tissue is the Gleason grading system, shown in FIG. 2. In this system, prostate tissue is classified into five grades numbered 1 through 5. The grade increases with increasing malignancy level and cancer aggressiveness. Particularly, the Gleason grade characterizes tumor differentiation, which is the degree of tumor resemblance to normal tissue. Grade 1 corresponds to well-differentiated tissue, which is tissue with the highest degree of resemblance to normal tissue. Thus, patients with Grade 1 prostate tissue typically have a high chance of survival. On the other hand, grade 5 corresponds to poorly differentiated tissue, and thus patients with grade 5 tissue typically have a lower chance of survival. For reference, a pathologist has determined that the prostate tissue shown in FIG. 1(b) has a Gleason grade of 2 and the prostate tissue in FIG. 1(c) has a Gleason grade of 5. In addition to a patient's Gleason grade, pathologists often also assign a Gleason score to a tissue section. A patient's overall Gleason Score is the sum of the two most predominant Gleason grades present in a prostate tissue section (which can come from analysis of several tissue portions corresponding to different parts of the tissue section). For example, if the most predominant Gleason grade is 3 and the second most common grade is 4, then the Gleason score is 3+4=7. Thus, the Gleason score can vary from 2 to 10.

Although the above-described cancer diagnosis and Gleason grading by a pathologist are widely considered to be reliable, these are subjective processes. Particularly, physicians rely heavily on their own expertise and training when viewing tissues samples in order to determine whether the tissue is cancerous or non-cancerous and/or to determine Gleason grade(s) for the tissue. Thus, different pathologists viewing the same tissue samples may come up with conflicting interpretations.

Various studies have focused on computer-assisted systems for cancer detection in prostate tissue and, more particularly, in images of prostate tissue. The following discussion is presented for informational purposes only and is not an admission of prior art. One machine vision system uses shape and Haralick texture features to identify stroma, normal, and cancerous regions in the image [1]. The Haralick texture features are calculated by first constructing a so-called co-occurrence matrix, and then calculating 13 second-order statistics. The system is reported to have achieved an accuracy of 79.3% in classifying image regions. Another system has been developed for classifying blocks of tissue images into the stroma, benign prostatic hyperplasia, prostatic intraepithelial neoplasia (PIN), and prostate cancer classes [2]. The images are captured in multiple spectral bands which refer to light wavelength ranges. For each image block, texture features and the area occupied by nuclei and lumens relative to the area of the image block are computed. These features are then used to classify the image block using principal component analysis and the linear Gaussian classifier. A classification accuracy of 94% using a cross-validation method has been reported. However, it should be noted that both of these systems involve image segmentation prior to extracting image features, which can introduce segmentation error.

Additionally, several methods have been proposed for computer-assisted Gleason grading of prostate cancer. In one method, statistical and structural features are extracted from the spatial distribution of epithelial nuclei over the image area [3]. A hybrid neural network/Gaussian statistical classifier is used to distinguish moderately and poorly differentiated histological samples. An accuracy of 77% on a set of 130 independent test images was reported. Notably, no algorithm for segmenting the epithelial nuclei was described, and thus this stage of analysis was most likely performed manually. In another method, the power spectrum is used to represent the texture characteristics of tissue images, and principal component analysis is applied to the power spectrum for feature space dimensionality reduction [4]. A nearest-neighbor (NN) classifier is used to assign the input image to Gleason grade 1, 2, 3, or combined grades of 4 and 5. An accuracy of 90% on a set of 20 independent test images was reported. Still another method has proposed the use of features derived from spanning trees connecting cell nuclei across the tumor image to represent tissue images belonging to each grade [5]. No quantitative results on the performance of this method have been reported. In another method, features based on co-occurrence matrices, wavelet packets, and multiwavelets are extracted and a k-NN classifier is used to classify each image into grade 2, 3, 4, or 5 [6]. An accuracy of 97% using the leave-one-out (LOO) procedure for error estimation was reported. However, the same leave-one-out procedure was used for both training and testing. This could potentially have introduced positive bias into the reported results.

Thus it is seen that traditional methods for computer-assisted cancer diagnosis and grading have achieved varying results. Accordingly, it would be desirable to provide improved systems and methods for automated cancer diagnosis and grading of tissue images.

SUMMARY OF THE INVENTION

Embodiments of the invention relate to systems and methods for automated diagnosis and grading of tissue images. For example, in one embodiment, the invention provides systems and methods for extracting image-level morphometric data from an image of prostate tissue and evaluating the image-level morphometric data alone to determine whether the tissue is cancerous or non-cancerous. In another embodiment, the invention determines a Gleason grade for the prostate tissue by evaluating image-level morphometric data from the tissue image. As used herein, morphometric data is any data extracted from the image by a computer that characterizes a color, structural, and/or textural property of the image. "Image-level" morphometric data is any morphometric data that can be extracted from unsegmented images. Contrast this to "object-level" morphometric data, which can only be extracted from a tissue image after the image has been segmented into histological object(s) (e.g., objects such as stroma, cytoplasm, epithelial nuclei, stroma nuclei, lumen, and red blood cells and/or sub-objects such as folded or unfolded chromatin texture). Examples of image-level morphometric data include fractal dimension data, fractal code data, wavelet data, and color channel histogram data.

In an aspect of the present invention, systems and methods are provided for extracting image-level morphometric data from a tissue image and using this data to diagnose and/or grade cancerous tissue. When the morphometric data is from a tissue image with a known classification with respect to a medical condition (e.g., cancer/non-cancer or Gleason grade), the morphometric data may be subject to feature selection and/or classifier training in order to build a model to predict the medical condition. When the morphometric data is for a tissue image with an unknown classification, the morphometric data may be evaluated by a model that classifies the medical condition in the tissue.

In one embodiment, systems and methods are provided for extracting fractal dimension data from a tissue image. The tissue image is thresholded at one or more $N_b$ fixed, equally-spaced thresholds in one or more of its red, green, and blue (RGB) color channels to obtain one or more binary images. For example, thresholding the image at all $N_b$ thresholds in each of the RGB channels results in $3N_b$ binary images. A fractal dimension value $y_k^i$ is computed through the use of the box counting algorithm for each binary image. The resulting measurements of these fractal dimension values may be used as image-level morphometric features for classification.

In another embodiment, systems and methods are provided for extracting fractal code data from a tissue image. The tissue image is partitioned into non-overlapping blocks of two different sizes: range blocks $B_j$ and domain blocks $\overline{A}_i$. Generally, for each range block $B_j$, a search is performed for a domain block $\overline{A}_i$ and a transformation $T_i$ (described below) such that the transformed domain block $T_i \overline{A}_i$ is a close approximation of $B_j$. All domain blocks are examined to find the closest approximation to the given range block. Characteristics of the transformation may then be used as image-level morphometric features for classification.

More particularly, for each range block $B_j$, the construction of the fractal transformation (code) is performed. This involves averaging and downsampling the domain block $\overline{A}_i$ with a transformation denoted as $T_i^d$, and the resulting block is denoted as $A_i = T_i^d \overline{A}_i$. Then, a search is performed for a transformation $T_i^t$ such that a mean square error (MSE) between the domain block and range block is minimized. $T_i^t$ can be represented as a composition of two transforms:

$$T_i^t = T_i^a \cdot T_i^s$$

where $T_i^s$ is a pixel shuffling transform (stage 704) and $T_i^a$ denotes an affine transform on the pixel gray level values (stage 706). The pixel shuffling transform can be one of the following: (1) identity; (2-5) reflections about the mid-vertical and mid-horizontal axes, and first and second diagonals; and (6-8) rotations about the block center by +90°, -90°, and +180°.

$T_i^a$ may be determined as follows: In one embodiment, for a fixed $T_i^s$, the optimal $T_i^a$ that minimizes the MSE is determined as follows. Let X and Y be image blocks $A_i$ and $B_j$ reordered as:

$$X = \begin{bmatrix} A_{i11} & A_{i12} & \cdots & A_{iNN} \\ 1 & 1 & \cdots & 1 \end{bmatrix} \text{ and } Y = \lfloor B_{j11} \ B_{j12} \ \cdots \ B_{jNN} \rfloor.$$

where this reduces the problem of finding an optimal $T_i^a$ to a matrix calculus problem of finding a minimum. Particularly, the squared Euclidean distance $D_E^2$ between the transformed block $T_i^a X$ and Y is considered as a matrix function of the transform $T_i^a$:

$$D_E^2(T_i^a X, Y) = \|T_i^a X - Y\|_2^2.$$

Differentiating this with respect to $T_i^a$ and setting the derivative to zero, this becomes:

$$T_i^a X X^t - Y X^t = 0$$

where $(.)^t$ denotes the transpose. Assuming that $(XX^t)^{-1}$ exists, the solution to this latter equation is given by:

$$T_i^a = Y X^+ = Y X^t (X X^t)^{-1}$$

where $(.)^+$ is the Moore-Penrose pseudoinverse. The best combination of $T_i^s$ and $T_i^a$ for the range block $B_j$ is found by repeating the above process for all possible $T_i^s$ and taking the pair of $T_i^s$ and $T_i^a$ that minimizes the MSE. In another embodiment, $T_i^a$ may be selected from a plurality of predetermined $T_i^a$ based on whether the range block under examination is a shade, edge, or midrange block (where the predetermined $T_i^a$ is not necessarily the optimal $T_i^a$).

Each range image block $B_j$ is then characterized using one or more of the parameters of the fractal code constructed for it, and these parameter(s) may be used as image-level morphometric feature(s) for classification. Let $$I = \underset{i}{\mathrm{argmin}} MSE_{ij},$$

where i indexes domain blocks. The parameters may include $MSE_{ij}$, shift and scaling parameters of the affine transform $T_{ij}{}^a$, shuffling transform $T_{ij}{}^s$, and the Euclidean distance between $A_I$ and $B_j$ in the image plane.

In still another embodiment, systems and methods are provided for extracting wavelet data from a tissue image. A wavelet representation of the tissue image may be generated using a 4-level, dyadic transform and the symlet 4 wavelet filter. The variance $\sigma^2$ of the coefficients is computed for each of the subbands, where $\sigma^2$ is given by:

$$\sigma^2 = \frac{1}{MN} \sum_i \sum_j x_{ij}^2 - \left(\frac{1}{MN} \sum_i \sum_j x_{ij}\right)^2,$$

where $x_{ij}$, i=1, ..., M, j=1, ..., N, denotes a wavelet coefficient in a subband of size MN. The resulting measurements of these variances may be used as image-level morphometric features for classification.

In another embodiment, systems and methods are provided for extracting color channel histogram data from a tissue image. The tissue image is separated into its red, green, and blue (RGB) color channels. One or more of the color channel images is separated into bins representing various levels of color intensity. A pixel count is computed for one or more of these bins. These pixel count(s) may be used as image-level morphometric features for classification.

In another aspect of the present invention, systems and methods are provided for generating a predictive model based on image-level morphometric data extracted from tissue images with known classification with respect to a medical condition (e.g., cancer/non-cancer or Gleason grade). Generating a predictive model may include using an analytical tool to train a neural network or other learning machine with image-level morphometric data from a plurality of tissue images with known classification. In one embodiment, the training data includes image-level morphometric data consisting of fractal dimension data, fractal code data, wavelet data, color channel histogram data, or a combination thereof The analytical tool may determine an affect of the features on the ability of an associated model to predict the medical condition. Features that increase the predictive power of the model may be included in the final model, whereas features that do not increase (e.g., maintain or decrease) the predictive power may be removed from consideration.

In another aspect of the present invention, systems and methods are provided that use a 2-stage procedure for tissue image analysis. In a first stage, a first set of morphometric data from a tissue image with unknown classification is evaluated by a model that predicts whether the corresponding tissue is cancerous or non-cancerous. In a second stage, if the model classifies the tissue as cancerous tissue, a second set of morphometric data from the tissue image is evaluated by a model that assigns a cancer grade to the tissue (e.g., a Gleason grade for prostate tissue). The second set of morphometric feature(s) may include at least one morphometric feature not included in the first set of morphometric feature(s). For example, in the first stage, one or more image-level morphometric features from the tissue image (e.g., fractal dimension, fractal code, wavelet, and/or color channel histogram feature(s)) may be evaluated by the model that predicts whether the tissue is cancerous or non-cancerous. In the second stage, one or more object-level features, alone or in combination with image-level features, may be evaluated by the model that assigns a cancer grade to the tissue. In an embodiment, the second set of morphometric features may be extracted from the tissue image only if the tissue is classified by the model as being cancerous. In this way, the resources of physicians, other individuals and/or automated processing equipment (e.g., equipment for extracting morphometric data from tissue images) may be conserved. In another embodiment, the first and second sets of morphometric features may be extracted from the tissue image at the same time. This two-level procedure may be used to, for example, identify in a whole tissue section (or other suitable size tissue section), portions of the section that are cancerous, and then to further analyze those sections.

BRIEF DESCRIPTION OF THE DRAWINGS

For a better understanding of the present invention, reference is made to the following description, taken in conjunction with the accompanying drawings, in which like reference characters refer to like parts throughout, and in which:

FIGS. 1(a)-1(c) show grayscale images of normal and cancerous prostate tissue;

FIG. 9 is a flowchart of illustrative stages involved in extracting color channel histogram data from a tissue image;

FIG. 10(a) shows a histogram of the green channel for the tissue images depicted in FIG. 1;

FIG. 10(b) shows histograms of the difference between the values in the red and blue channels for the images depicted in FIG. 1;

FIG. 12 is a flowchart of illustrative stages involved in screening tissue through the use of a two-level procedure;

FIGS. 13(a) and 13(b) are block diagrams of systems that use a predictive model to make a medical decision;

FIG. 14 shows the results of study in which models capable of automated prostate cancer diagnosis were generated based on morphometric data from tissue images with known classification;

FIG. 16 shows the results of study in which models capable of automated Gleason grading were generated based on morphometric data from tissue images with known classification.

DETAILED DESCRIPTION OF THE INVENTION

Embodiments of the invention relate to systems and methods for automated diagnosis and grading of tissue images. The diagnosis and/or grading may be based on any suitable image-level morphometric data extracted from the tissue images including fractal dimension data, fractal code data, wavelet data, and/or color channel histogram data. As used herein, "data" of a particular type (e.g., fractal dimension or wavelet) may include one or more features of that type. The diagnosis and/or grade may be used by physicians or other individuals to, for example, select an appropriate course of treatment for a patient. The following description focuses primarily on the application of the present invention to cancer diagnosis and Gleason grading of images of prostate tissue. However, the teachings provided herein are also applicable to, for example, the diagnosis, prognosis, and/or grading of other medical conditions in tissue images such as other types of disease (e.g., epithelial and mixed-neoplasms including breast, colon, lung, bladder, liver, pancreas, renal cell, and soft tissue).

In an aspect of the present invention, an analytical tool may be provided that determines correlations between morphometric data from one or more tissue images and a medical condition. The correlated features may form a model that can be used to predict the condition. For example, based on image-level morphometric data from tissue images for which it is known whether the corresponding tissue is cancerous or non-cancerous, an analytical tool may generate a model that can predict whether tissue depicted in a tissue image for a new patient is cancerous or non-cancerous. As another example, based on image-level morphometric data from tissue images for which cancer grades for the corresponding tissue are known (e.g., the grades being determined manually by a pathologist), an analytical tool may generate a model that can predict a cancer grade for tissue depicted in a tissue image for a new patient. In both examples, the correlated features may be extracted from the new tissue image and evaluated by the model. In these contexts, the predictive model may determine the current status of the tissue. In other contexts, predictive models may be generated that can make determinations about the future status of the associated patient (e.g., whether and/or when the patient is likely to experience, at some future point in time, disease such as cancer occurrence or recurrence).

Figure 2:
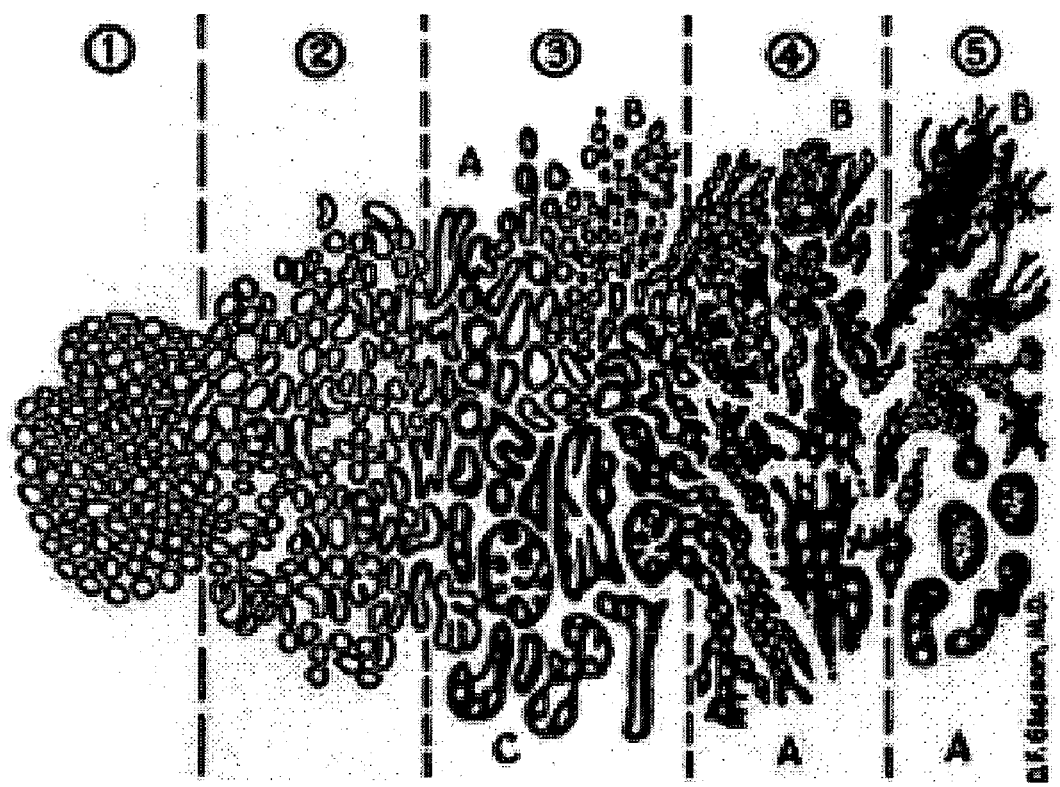
FIG. 2 shows the Gleason grading system for characterizing the level of aggressiveness of cancer in prostate tissue.
Figure 3:
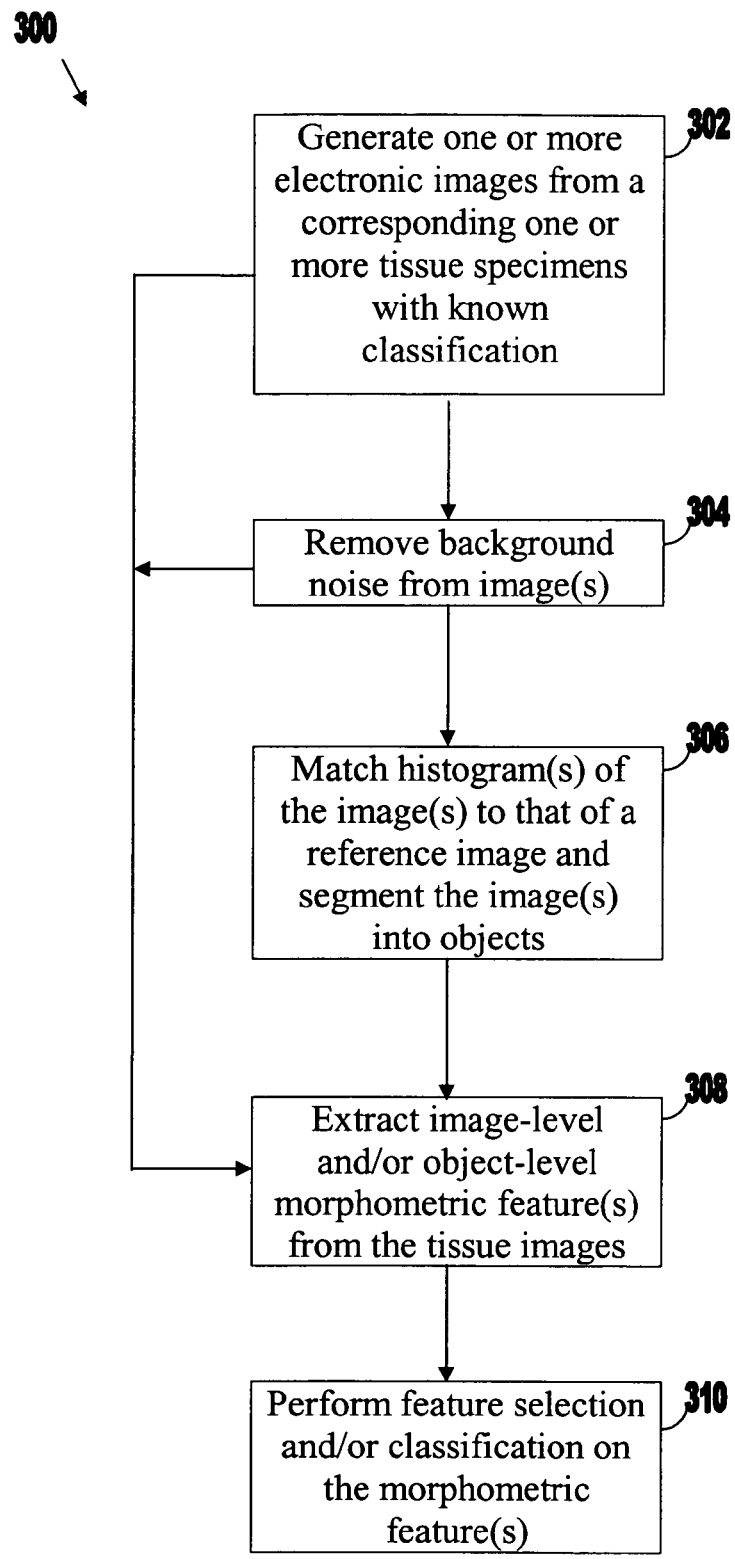
FIG. 3 is a flowchart of illustrative stages involved in generating a model for automated cancer diagnosis or grading of tissue images based on morphometric data from one or more tissue images with known classification.

FIG. 3 is a flowchart 300 of illustrative stages involved in generating a predictive model for automated diagnosis or grading of tissue images based on morphometric data from one or more tissue images. At stage 302, one or more electronic (digital) images may be generated from a corresponding one or more tissue specimens with known classification such as, for example, tissue microarray (TMA) whole tissue sections or cores stained with Hematoxylin and Eosin (H&E). For example, for automated cancer diagnosis, it may have been previously determined by a pathologist for each of the images whether the corresponding tissue is cancerous or non-cancerous. For automated cancer grading, cancer grades may have been previously determined by a pathologist for the tissue depicted in the images. An image processing tool may be provided that includes a light microscope for capturing tissue images at 20× magnification using a SPOT Insight QE Color Digital Camera (KAI2000) and for producing images with 1600×1200 pixels. The images may be stored as images with 24 bits per pixel in TIFF format. Such an image processing tool is described in above-incorporated U.S. patent application Ser. No. 11/080,306, now U.S. Pat. No. 7,467,119, and the images shown in FIGS. 1(a)-1(c) were generated by such an image processing tool. Such equipment is only illustrative and any other suitable hardware, software, or combination thereof may be used to capture the tissue images from tissue specimens without departing from the scope of the present invention.

At stage 304, the tissue image(s) may be pre-processed in order to remove background noise. Stage 304 may be optionally included when, for example, the tissue images are TMA cores. For example, referring to the images of TMA cores shown in FIGS. 1(a)-1(c), the transparent regions at the corners of the tissue images correspond to background noise in that these regions are not occupied by the tissue. Thus, these transparent regions may be identified and removed from further analysis by, for example, an intensity thresholding and convex hull operation.

At stage 306, a second pre-preprocessing stage may be performed in order to match histograms of the image(s) to that of a reference image [7]. This aims to alleviate color variations in the images due to varying staining and illumination conditions. Stage 306 may be optionally included when, for example, the image is to be segmented into histological objects such as stroma, lumen, and red blood cells for extraction and analysis of object-level features (described below), because color variations between images potentially can affect segmentation accuracy. Segmenting of the image(s) may also optionally be performed at stage 306. Note that while histogram matching benefits image segmentation, it may distort image color information. Thus, morphometric color features are preferably extracted from the original (i.e., not segmented) images. For example, morphometric color features may be extracted from segmented images by superimposing the segmented objects on the original image.

At stage 308, morphometric data including one or more morphometric features is extracted from the tissue image(s). For example, the morphometric data may include image-level data extracted from the image such as fractal dimension data, fractal code data, statistical data computed from the wavelet transform of the image, and color channel histogram data. Image-level morphometric data is preferably obtained from the original (i.e., not segmented) image to, for example, prevent the influx of segmentation error into the measurements of the image-level morphometric features. As another example, the morphometric data may include-object level data, which must be extracted from a segmented version of the original image. Segmenting of tissue images into histological objects of various classes (e.g., lumen, stroma, nuclei) and extracting object-level data from the segmented images are described in above-incorporated U.S. patent application Ser. No. 11/080,306, now U.S. Pat. No. 7,467,119. For example, the object-level data may include statistics such as the mean intensity, area, and the standard deviation of the intensity for each of the segmented object classes. The object-level features may also include features describing the spatial relationships between histological objects. In one embodiment, extraction of object-level morphometric data may be performed by an image processing tool that includes the commercially-available Definiens Cellenger Developer Studio (v. 4.0) adapted to perform the segmenting and classifying of, for example, the various pathological objects described above and to measure various morphometric features of these objects. An example of such an image processing tool is Aureon Laboratories' MAGIC™ system. Additional details regarding the Definiens Cellenger product are described in [8]. Any suitable combination of image-level data and/or object-level data may be extracted from the image at stage 308. Additional details regarding extracting morphometric data from tissue images is described below in connection with FIGS. 4, 6-9 9 and 11.

At stage 310, feature selection and classification are performed on the one or more morphometric features extracted at stage 308. Feature selection is the process of choosing, from a set of available features, at least a subset of the features that are most relevant to the classification task. Classification is the process of assigning to a sample (e.g., a dataset of morphometric features for a patient) a label from a finite set of labels. For example, the morphometric features extracted at stage 308 may be selected for inclusion in a model that predicts whether tissue is cancerous or non-cancerous or that assigns a particular cancer grade (e.g., a Gleason grade) to the tissue. Features that increase the discriminative power of the model may be included in the final model, whereas features that do not increase (e.g., or decrease) the discriminative power may be removed from consideration. The final model may be used to evaluate morphometric data from a tissue image for a new patient in order to make a classification decision for the patient.

Feature selection has two benefits. It reduces the computational cost of recognition (e.g., reducing the number of features that must be computed for a new patient) and it usually improves classification accuracy by mitigating the effect of the "curse of dimensionality" [9] [10][11]. All feature selection algorithms are characterized by two traits [9]. The first is the optimality criterion J with respect to which the quality of a feature subset is evaluated. For example, in the illustrative Studies 1 and 2 described below, J was selected as the classification accuracy estimated using the "leave one out" (LOO) procedure. The second characteristic is a search strategy used to find a locally or globally optimal feature combination. In "exhaustive search" (ES), the globally optimal subset of features is found by evaluating all possible feature combinations. ES is often computationally infeasible. Instead, greedy strategies are used that add or remove features from the feature subset in a stepwise fashion. For example, the "sequential forward search" (SFS) algorithm described in the below Studies 1 and 2 is a greedy strategy [9]. The use of LOO, ES, and SFS for feature selection is only illustrative and any other procedure for selecting features for inclusion in a predictive model may be used without departing from the scope of the present invention. For example, in another embodiment, a sequential back search algorithm may be used for feature selection.

Statistical classifiers fall into two general categories of parametric and non-parametric methods. Parametric methods rely on the assumption that the functional form of class-conditional distributions are known (e.g., Gaussian), whereas non-parametric methods make minimal assumptions about the form of the distributions. The choice of the classifier type depends on the sample size and optionally prior knowledge about the distribution of the features. In the illustrative Studies 1 and 2 described below, parametric methods were used.

Thus, by assuming that the class-conditional distributions are Gaussian, the Bayes decision rule f(X) is a quadratic function of the feature vector X described in [9]:

$$f(X) = (X - \mu_0)^T \Sigma_0^{-1}(X - \mu_0) - (X - \mu_1)^T \Sigma_1^{-1}(X - \mu_1) + \ln\frac{|\Sigma_0|}{|\Sigma_1|} - \ln\frac{P_0}{P_1} \quad (1)$$

where $P_i, \mu_i, \Sigma_i$ are the prior probability, mean, and covariance matrix of class i, i=0, 1, respectively, and |.| denotes a matrix determinant. For identical covariance matrices $\Sigma_0 = \Sigma_1 = \Sigma$, (1) simplifies to a linear function given by:

$$f(X) = (\mu_1 - \mu_0)^T \Sigma^{-1} X + \frac{1}{2}\left(\mu_0^T \Sigma^{-1} \mu_0 - \mu_1^T \Sigma^{-1} \mu_1\right) - \ln\frac{P_0}{P_1} \quad (2)$$

The classifiers given by (1) and (2) are referred to as quadratic and linear classifiers, respectively. The Bayes decision rule is as follows: decide class 0 (e.g., non-cancerous image), if $f(X)<0$; decide class 1 (e.g., cancerous image), if $f(X)>0$; and pick a class at random if $f(X)=0$. The use of parametric methods for classification is only illustrative. Non-parametric methods or other methods for classification may be used without departing from the scope of the present invention.

For a given classifier and a dataset to be classified (e.g., a dataset including morphometric data from images for a plurality of patients with known classification), the sample classification accuracy $\hat{P}_a$ is estimated as $\hat{P}_a = n_c/n$, where $n_c$ denotes the number of correctly classified samples and n is the total number of samples in the dataset. Two related performance measures often used in detection tasks are sensitivity and specificity. Let class 0 and class 1 correspond to, for example, the absence and presence of disease (or a lower or higher degree of disease) and let $n_i$ be the number of patients in class i, i=0, 1. Moreover, let $n_{ij}$=0, 1, j=0, 1, denote the number of patients in class i classified into class j. Sample sensitivity $\hat{P}_{SE}$ is defined as $\hat{P}_{SE} = n_{11}/n_1$ and sample specificity $\hat{P}_{SP}$ is defined as $\hat{P}_{SP} = n_{00}/n_0$. Generally, predictive models with higher sensitivity and specificity make more accurate classification decisions such as, for example, whether tissue is cancerous or non-cancerous and/or whether the tissue should be assigned a particular grade.

FIGS. 4, 6-9 and 11 are flowcharts of illustrative stages involved in extracting morphometric data from tissue image(s). For example, one or more of the stages shown in FIGS. 4, 6-9 and 11 may be substages of stage 308 (FIG. 3), which relates to extracting morphometric data from one or more known tissue images in order to generate a predictive model. As another example, one or more of the stages shown in FIGS. 4, 6-9 and 11 may be used to extract morphometric data from a tissue image for a new patient with an unknown classification for a determination of the classification by a final predictive model. However, when morphometric data is extracted from an image for a new patient, preferably only the morphometric feature(s) evaluated by the predictive model (and therefore previously determined to correlate with a medical condition) are extracted from the image (although, in another embodiment, all features may be extracted and only the relevant features considered).

Figure 4:
FIG. 4 is a flowchart of illustrative stages involved in extracting fractal dimension data from a tissue image.

FIG. 4 is a flowchart 400 of illustrative stages involved in extracting fractal dimension data from a tissue image. Generally, fractal geometry provides a tool for quantitative description of complex, irregularly shaped objects in pathological images [11]. A common fractal property of an object is its fractal dimension. The fractal dimension provides a quantitative measure of the space-filling capacity of an object. For example, the fractal dimension of a straight line is the same as its topological dimension (i.e., 1) since it can only fill a one-dimensional sub-space. For a more complex curve, the fractal dimension can be fractional and therefore different from its topological dimension. A more detailed description of the fractal dimension and traditional methods of its calculation through the use of the box counting algorithm is given in [11][12]. Traditionally, the fractal dimension has been measured with respect to the outline of a histological object in a segmented image that has not been decomposed into its respective color channels.

Figure 5:
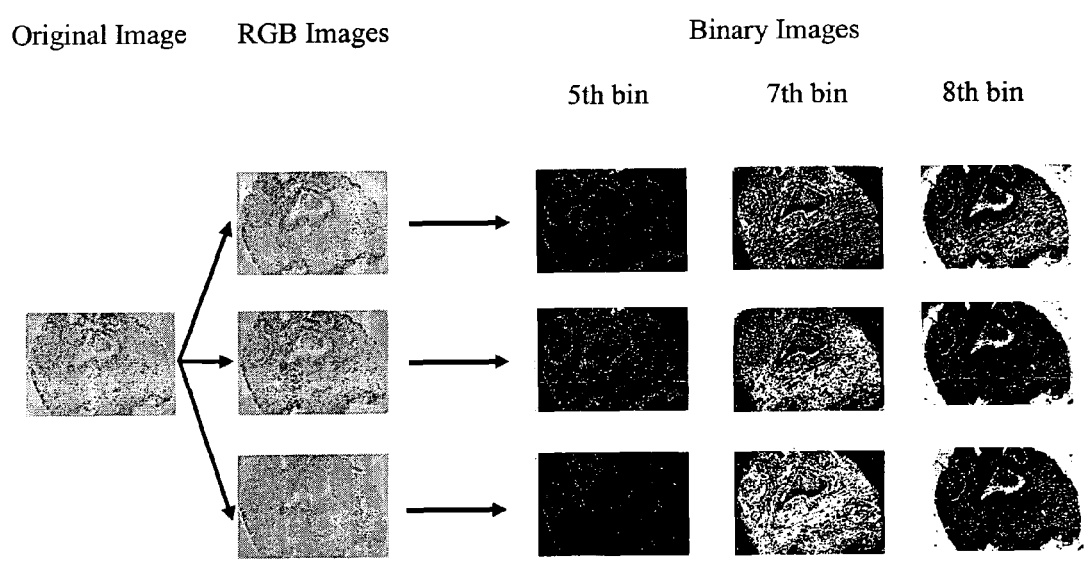
FIG. 5 is a diagram that illustrates the decomposition of a color image into red, green, and blue (RGB) images, with all color images depicted in grayscale for reproducibility, and from RGB images into binary images for extraction of fractal dimension data.

In contrast, at stage 402, the tissue image is thresholded at $N_b$ fixed, equally-spaced thresholds in each of its red, green, and blue (RGB) color channels, resulting in $3N_b$ binary images. For example, when each of the RGB channels has a full-range intensity of 0-250, each of these color channels may be separated into $N_b$ bins equally-spaced apart in intensity level intervals of $250/N_b$ intensity levels (e.g., bin 1 including all pixels of intensity 0 through $250/N_b$). For each bin, the pixels from the original image that have been assigned to that bin are rendered white and all other pixels are rendered black. FIG. 5 is a diagram that illustrates the decomposition of an input color image into RGB images, with all color images depicted in grayscale for reproducibility, and from RGB images into binary images, in accordance with an embodiment of the present invention.

At stage 404, a fractal dimension value $\gamma_k^i$ is computed through the use of the box counting algorithm for each binary image $B_k^i$ obtained by applying the k-th threshold to the i-th channel. At stage 406, the values $\gamma_k^i$, i=1, 2, 3, k=1, . . . , $N_b$ are put together to form a $3N_b$-dimensional feature vector $\gamma = [\gamma_1^1, \ldots, \gamma_{N_b}^1, \gamma_1^2, \ldots, \gamma_{N_b}^2, \gamma_1^3, \ldots, \gamma_{N_b}^3]$. This vector provides a fractal representation of the original input image. When the fractal dimension vector is for a patient with a known classification, each of the entries in the vector may be tested by the above-described feature selection and classification procedures. Accordingly, it may be determined whether these fractal dimension features correlate with a medical condition. For example, in the illustrative Studies 1 and 2 described below for automated cancer diagnosis and Gleason grading, $N_b=12$, which yielded a feature vector $\gamma$ including 36 fractal dimension features. In other embodiments of the present invention, only a subset of the $3N_b$ features may be computed and/or included in the feature vector used for feature selection and classification (e.g., based on prior knowledge that one or more of the $3N_b$ features are more important than others). Moreover, when the vector is for a new patient, the vector preferably includes only the fractal dimension feature(s) evaluated by the final predictive model.

Figure 6:
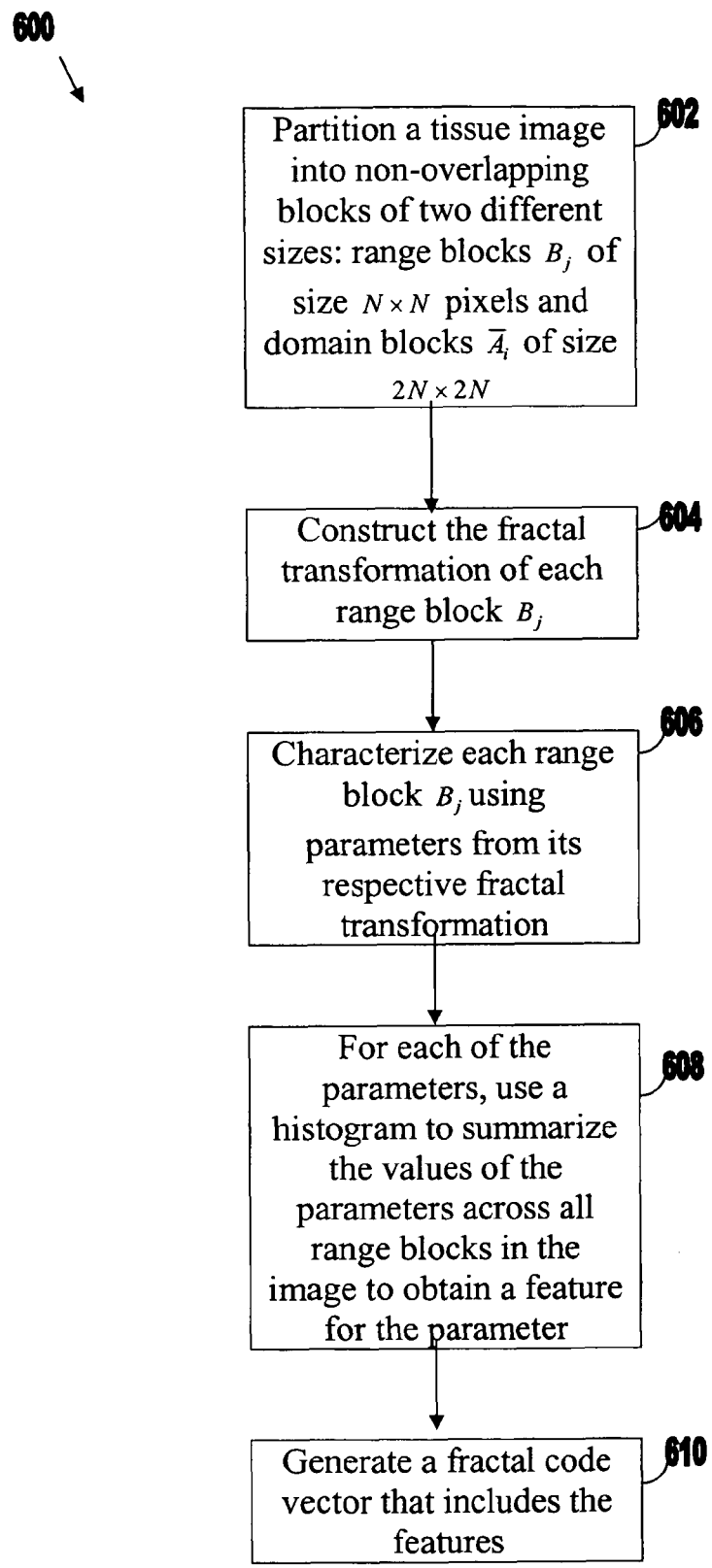
FIG. 6 is a flowchart of illustrative stages involved in extracting fractal code data from a tissue image.
Figure 7:
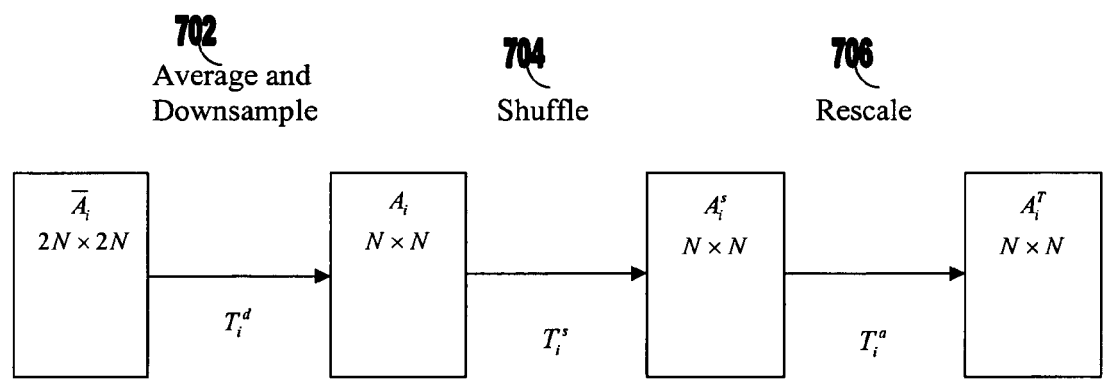
FIG. 7 is a diagram of illustrative substages involved in the stage of constructing a fractal transformation (FIG. 6)

FIG. 6 is a flowchart 600 of illustrative stages involved in extracting fractal code data from a tissue image. Fractal code features are motivated by the notions of fractal image compression [12] [13]. Fractal codes are discrete contractive affine transformations mapping image blocks to image blocks. They capture the self-similarity of image blocks at two different scales. Generally, the aim is to measure the extent to which, and manner in which, smaller portions of the image can be represented by larger portions of the image using affine transform. Visual examination of the images in FIG. 1 reveals that the texture of prostate tissue appears to be finer and more isotropic at a microscale (and therefore potentially more fractal in nature) with increasing level of cancer aggressiveness. In the illustrative Studies 1 and 2 described herein, the contractive constraint on the pixel gray level affine transformation was relaxed. Fractal codes have inspired descriptors for texture characterization and image retrieval [14][15], but fractal codes can also be for characterization of medical images. Additionally, different methods of calculating fractal codes may be used. While some embodiments of the invention are related to predicting a Gleason grade based on fractal code data, the inventors also envision that one or more fractal code measurements of self similarity could potentially replace Gleason grading altogether.

At stage 602, the image is partitioned into non-overlapping blocks of two different sizes: range blocks $B_j$ of size N×N pixels and domain blocks $\overline{A}_i$ of size 2N×2N. Here, the factor of 2 was chosen arbitrarily. Any other suitable one or more factors may be used without departing from the scope of the present invention. For every range block $B_j$, a search is performed for a domain block $\overline{A}$ and a transformation $T_i$ (described below) such that the transformed domain block $T_i \overline{A}_i$ is a close approximation of $B_j$. All domain blocks are examined to find the closest approximation to the given range block. The mean-square error (MSE) given by:

$$MSE_{ij} = \frac{1}{N^2} \|T_i \overline{A}_i - B_j\|_2^2 \qquad (3)$$

where $T_i \overline{A}_i$ and $B_j$ are the transformed domain and range blocks, respectively, and the MSE is used as the measure of closeness between the transformed domain block and the range block.

Then for each range block $B_j$, the construction of the fractal transformation (code) is performed at stage 604. Stage 604 includes the three substages shown in FIG. 7. At stage 702, the domain block $\overline{A}_i$ is averaged in 2×2 blocks and downsampled by a factor of 2. This transformation is denoted as $T_i^d$, and the resulting block is denoted as $A_i = T_i^d \overline{A}_i$. It should be noted that $A_i$ is of the same size as $B_j$. Then, a search is performed for a transformation $T_i^t$ such that (3) is minimized. Following [13], $T_i^t$ can be represented as a composition of two transforms:

$$T_i^t = T_i^a \cdot T_i^s$$

where $T_i^s$ is a pixel shuffling transform (stage 704) and $T_i^a$ denotes an affine transform on the pixel gray level values (stage 706). The pixel shuffling transform can be one of the following, as set forth in [13]: (1) identity; (2-5) reflections about the mid-vertical and mid-horizontal axes, and first and second diagonals; and (6-8) rotations about the block center by +90°, −90°, and +180°.

However, in accordance with an embodiment of the present invention, a different procedure is proposed for calculating $T_i^a$ than the procedure described in [13]. Particularly, in [13] range blocks are classified into categories of shade, edge, and midrange blocks, and within each category a different, predetermined $T_i^a$ is used (where the $T_i^a$ is not necessarily the optimal $T_i^a$). Additionally, [13] applies a quantization procedure to discretize the transform coefficients. In contrast, the following procedure according to an embodiment of the present invention does not require individual blocks to be classified into categories, and no predefined limitations are placed on the than can be used. Particularly, for a fixed $T_i^s$, the optimal $T_i^a$, which minimizes (3), is determined as follows. Let X and Y be image blocks $A_i$ and $B_j$ reordered as:

$$X = \begin{bmatrix} A_{i11} & A_{i12} & \cdots & A_{iNN} \\ 1 & 1 & \cdots & 1 \end{bmatrix} \text{ and } Y = \begin{bmatrix} B_{j11} & B_{j12} & \cdots & B_{jNN} \end{bmatrix}.$$

where this reduces the problem of finding an optimal $T_i^a$ to a matrix calculus problem of finding a minimum. Particularly, the squared Euclidean distance $D_E^2$ between the transformed block $T_i^a X$ and Y is considered as a matrix function of the transform $T_i^a$:

$$D_E^2(T_i^a X, Y) = \|T_i^a X - Y\|_2^2. \quad (4)$$

Differentiating (4) with respect to $T_i^a$ and setting the derivative to zero, (4) becomes:

$$T_i^a X X^t - Y X^t = 0 \quad (5)$$

where $(.)^t$ denotes the transpose. Assuming that $(XX^t)^{-1}$ exists, the solution to (5) is given by:

$$T_i^a = Y X^+ = Y X^t (XX^t)^{-1}$$

where $(.)^+$ is the Moore-Penrose pseudoinverse [9]. The best combination of $T_i^s$ and $T_i^a$ for the range block $B_j$ is found by repeating the above process for all possible $T_i^s$ and taking the pair of $T_i^s$ and $T_i^a$ that minimizes (3). In another embodiment of the present invention, the procedure described in [13] may be used to calculate $T_i^a$.

Returning to FIG. 6, at stage 606 each range image block $B_j$ is characterized using five parameters of the fractal code constructed for it. Let $$I = \underset{i}{\operatorname{argmin}} MSE_{ij},$$

where i indexes domain blocks. The parameters are $MSE_{Ij}$, shift and scaling parameters of the affine transform $T_{Ij}^a$, shuffling transform $T_{Ij}^s$, and the Euclidean distance between $A_I$ and $B_j$ in the image plane. At stage 608, the information in each of these parameters is summarized using the histogram of its values across all range blocks in the image. The histograms of the parameters are then put together to form a vector including the five fractal code features for that image at stage 610. When the fractal code vector is for a patient with known classification, each of the entries in the vector may be tested by the above-described feature selection and classification procedures. Accordingly, it may be determined whether these fractal code features correlate with a medical condition. For example, in the illustrative Studies 1 and 2 described below for automated cancer diagnosis and Gleason grading, N was set equal to 100 to obtain the fractal code features. Additionally, the number of bins for $MSE_{Ij}$, shift, scaling, shuffling transform, and the Euclidean distance between the domain and range blocks were set to 50, 20, 20, 8, and 10, respectively, yielding 108 total values for the five fractal code features. In other embodiments of the present invention, only a subset of the above-described five fractal code features or other fractal code features may be computed and/or included in the feature vector used for feature selection and classification (e.g., based on prior knowledge that one or more fractal code features are more important than others). Moreover, when the vector is for a new patient, the fractal code vector preferably includes only the fractal code feature(s) analyzed by the final predictive model.

Figure 8:
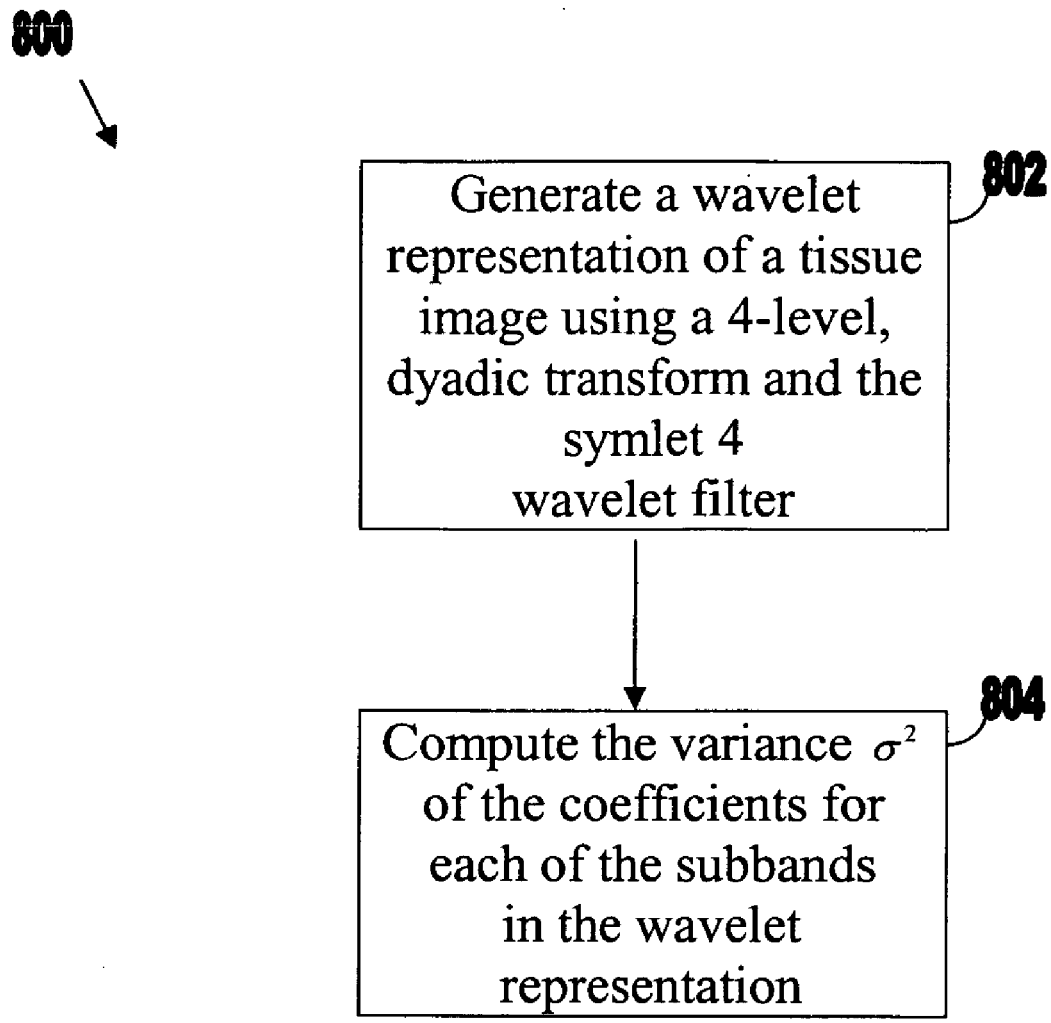
FIG. 8 is a flowchart of illustrative stages involved in extracting wavelet transform data from a tissue image.

FIG. 8 is a flowchart 800 of illustrative stages involved in extracting wavelet transform data from a tissue image. Wavelet transform features characterize texture at different scales and orientations [16]. At stage 802, a wavelet representation of the tissue image is obtained using a 4-level, dyadic transform and the symlet 4 wavelet filter [17]. At stage 804, the variance $\sigma^2$ of the coefficients is computed for each of the subbands, where $\sigma^2$ is given by:

$$\sigma^2 = \frac{1}{MN} \sum_i \sum_j x_{ij}^2 - \left(\frac{1}{MN} \sum_i \sum_j x_{ij}\right)^2,$$

where $x_{ij}$, i=1, . . . , M, j=1, . . . , N, denotes a wavelet coefficient in a subband of size MN. The measurements of the coefficients may then be used as features for classification.

FIG. 9 is a flowchart 900 of illustrative stages involved in extracting color channel histogram data from a tissue image. Generally, visual examination of the images in FIG. 1 reveals noticeable changes in colors of H&E-stained images (even in grayscale, as presented here for reproducibility) as the tissue transforms from benign to cancerous, and as the level of malignancy increases. This is due to the fact that the epithelial nuclei, characterized by a dark blue color, invade the pinkish stroma and whitish lumen regions. The relative area of lumen and stroma regions decreases with increasing cancer malignancy. This pattern of color changes can be captured by the color channel histograms of the tissue image. Accordingly, at stage 902, the image is separated into each of its RGB color channels. Then, each color channel image is separated into bins (e.g., 15 bins in the illustrative Studies 1 and 2 described below) representing grayscale levels of intensity at stage 904. When the tissue image is for a patient with known classification, the pixel content of the image in at least a subset of these bins may be computed at stage 906 (e.g., computing only the pixel content(s) in the one or more bins based on prior knowledge that these bin(s) more highly correlate with the medical condition). These pixel content(s) may be used as features in feature selection and classification in order to determine whether the features correlate with a medical condition. The correlated features may be included in a final model that predicts the medical condition. When the tissue image is for a new patient, preferably only the pixel content of the bin(s) included in the final predictive model are computed at stage 906. In another embodiment, the feature(s) may be taken from a 3-dimensional color histogram instead of three 1-dimensional histograms.

FIG. 10(a) shows a histogram of the green channel, which is highly correlated with image brightness, for the images depicted in FIG. 1. It is observed that there are far more bright pixels in the normal image than in the cancerous images. Moreover, the number of bright pixels decreases as the Gleason grade increases from 2 to 5.

FIG. 10(b) shows histograms of the difference between the values in the red and blue channels for the images in FIG. 1. Epithelial (and other) nuclei are characterized by large negative values of the difference between red and blue channels. The histograms indicate that for the normal tissue image there are fewer pixels with large negative values than for the cancerous images. As the Gleason grade increases (i.e., cancer becomes more aggressive), the number of such pixels rises.

The "white" pixels in prostate tissue images represent not only lumens but also background and artifacts caused by broken tissue structure. The effect of such white pixels on histogram analysis was studied by considering the histograms of the tissue images both before and after removing white pixels. Initial experiments have indicated that removing white pixels results in improved classification accuracy. White pixels were detected via simple thresholding using a fixed, global threshold. This was accomplished by first transforming the image from the RGB color space into the YCbCr space [7], and then applying the threshold to the luminance (Y) component.

As described above, object-level morphometric data may be extracted from tissue images for use in automated diagnosis and/or grading of tissue images. This involves segmenting the original image into object classes (e.g., stroma, nuclei, red blood cells, lumen, etc.) and measuring various morphometric features of the objects including spectral-based characteristics (red, green, blue (RGB) channel characteristics, such as mean values, standard deviations, etc.), position, size, perimeter, shape (asymmetry, compactness, elliptic fit, etc.) and/or relationships to neighboring objects (contrast). An image processing tool may measure these features for every instance of every identified pathological object in the image and may output these features for, for example, evaluation by a feature selection and classification procedure or by a final predictive model.

Figure 11:
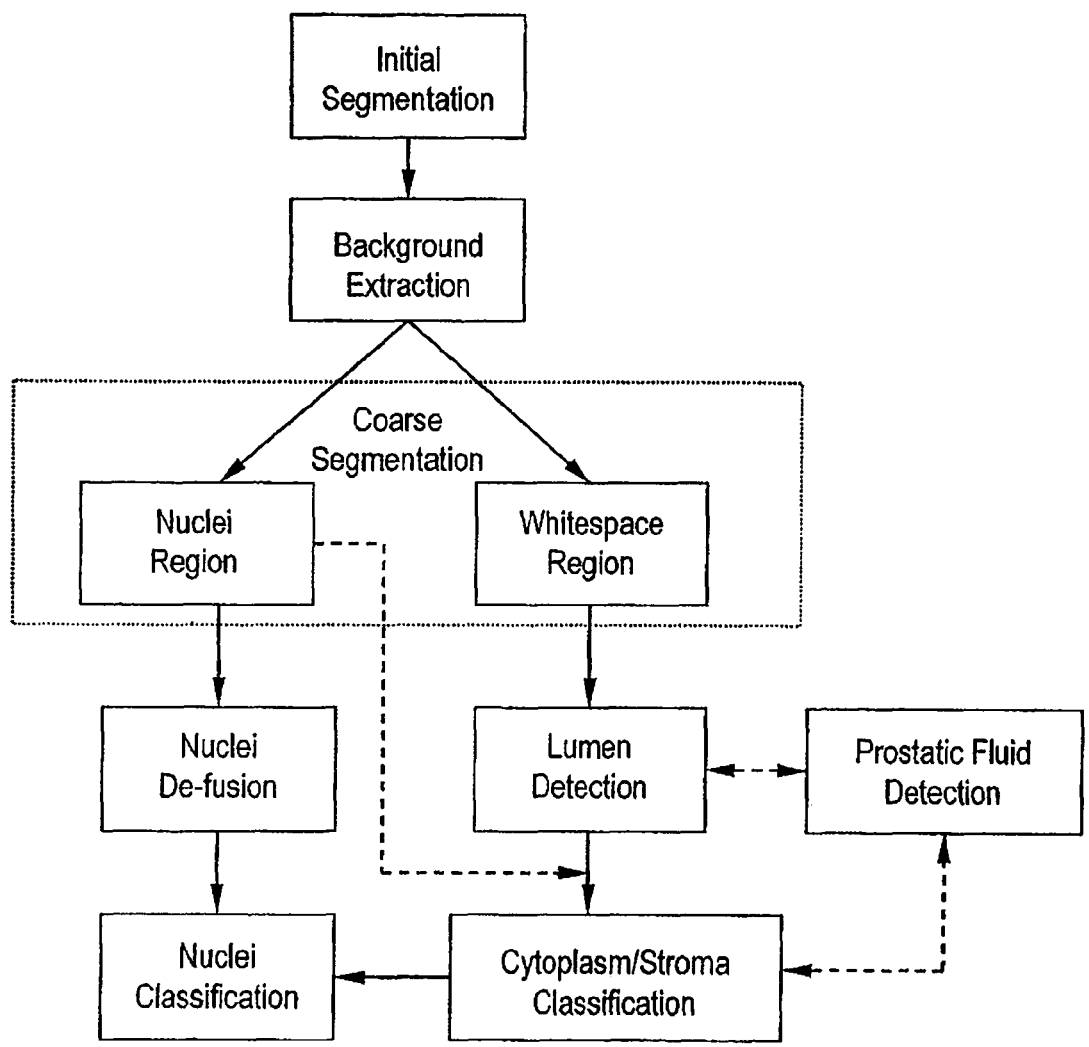
FIG. 11 is a flowchart of illustrative stages involved in segmenting a tissue image into objects for extraction of object-level morphometric data.

FIG. 11 is a flowchart of illustrative stages involved in segmenting a tissue image into objects for extraction of object-level morphometric data. As described above, an image processing tool including the commercially-available Definiens Cellenger Developer Studio (v. 4.0) may be used adapted to perform the segmenting of tissue images and the measuring of various morphometric data from the segmented images.

Initial Segmentation. In a first stage, the image processing tool may segment an image (e.g., an H&E stained tissue microarray (TMA) image or an H&E of a whole tissue section) into small groups of contiguous pixels known as objects. These objects may be obtained by a region-growing algorithm which finds contiguous regions based on color similarity and shape regularity. The size of the objects can be varied by adjusting a few parameters [18]. In this system, an object rather than a pixel is typically the smallest unit of processing. Thus, all morphometric feature calculations and operations may be performed with respect to objects. For example, when a threshold is applied to the image, the feature values of the object are subject to the threshold. As a result, all the pixels within an object are assigned to the same class. In one embodiment, the size of objects may be controlled to be 10-20 pixels at the finest level. Based on this level, subsequent higher and coarser levels are built by forming larger objects from the smaller ones in the lower level.

Background Extraction. Subsequent to initial segmentation, the image processing tool may segment the image tissue core from the background (transparent region of the slide) using intensity threshold and convex hull. The intensity threshold is an intensity value that separates image pixels in two classes: "tissue core" and "background". Any pixel with an intensity value greater than or equal the threshold is classified as a "tissue core" pixel, otherwise the pixel is classified as a "background" pixel. The convex hull of a geometric object is the smallest convex set (polygon) containing that object. A set S is convex if, whenever two points P and Q are inside S, then the whole line segment PQ is also in S.

Coarse Segmentation. In a next stage, the image processing tool may re-segment the foreground (e.g., TMA core) into rough regions corresponding to nuclei and white spaces. For example, the main characterizing feature of nuclei in H&E stained images is that they are stained blue compared to the rest of the pathological objects. Therefore, the difference in the red and blue channels (R−B) intensity values may be used as a distinguishing feature. Particularly, for every image object obtained in the initial segmentation step, the difference between average red and blue pixel intensity values may be determined. The length/width ratio may also be used to determine whether an object should be classified as nuclei area. For example, objects which fall below a (R−B) feature threshold and below a length/width threshold may be classified as nuclei area. Similarly, a green channel threshold can be used to classify objects in the tissue core as white spaces. Tissue stroma is dominated by the color red. The intensity difference d, "red ratio" $r=R/(R+G+B)$ and the red channel standard deviation $\sigma_R$ of image objects may be used to classify stroma objects.

White Space Classification. In the stage of coarse segmentation, the white space regions may correspond to both lumen (pathological object) and artifacts (broken tissue areas) in the image. The smaller white space objects (area less than 100 pixels) are usually artifacts. Thus, the image processing tool may apply an area filter to classify them as artifacts.

Nuclei De-fusion and Classification. In the stage of coarse segmentation, the nuclei area is often obtained as contiguous fused regions that encompass several real nuclei. Moreover, the nuclei region might also include surrounding misclassified cytoplasm. Thus, these fused nuclei areas may need to be de-fused in order to obtain individual nuclei.

The image processing tool may use two different approaches to de-fuse the nuclei. The first approach may be based on a region growing algorithm that fuses the image objects constituting nuclei area under shape constraints (roundness). This approach has been determined to work well when the fusion is not severe.

In the case of severe fusion, the image processing tool may use a different approach based on supervised learning. This approach involves manual labeling of the nuclei areas by an expert (pathologist). The features of image objects belonging to the labeled nuclei may be used to design statistical classifiers.

In one embodiment, in order to reduce the number of feature space dimensions, feature selection may be performed on the training set using two different classifiers: the Bayesian classifier and the k nearest neighbor classifier [3]. The leave-one-out method [4] may be used for cross-validation, and the sequential forward search algorithm may be used to choose the best features. Finally, two Bayesian classifiers may be designed with number of features equal to 1 and 5, respectively. The class-conditional distributions may be assumed to be Gaussian with diagonal covariance matrices.

In some embodiments, the input image may include different kinds of nuclei: epithelial nuclei, fibroblasts, basal nuclei, endothelial nuclei, apoptotic nuclei and red blood cells. Since the number of epithelial nuclei is typically regarded as an important feature in grading the extent of the tumor, it may be important to distinguish the epithelial nuclei from the others. The image processing tool may accomplish this by classifying the detected nuclei into two classes: epithelial nuclei and "the rest" based on shape (eccentricity) and size (area) features.

Additional details regarding image segmentation and classification in accordance with the present invention are described in above-incorporated U.S. patent application Ser. No. 11/080,360, now U.S. Pat. No. 7,467,119 and in U.S. patent application Ser. No. 10/991,897, now U.S. Pat. 7,483,554, filed Nov. 17, 2004, and U.S. Provisional Patent Application Nos. 60/520,815, filed Nov. 17, 2003 and 60/552,497, filed Mar. 12, 2004, all of which are hereby incorporated by reference herein in there entireties.

In another aspect, systems and methods are provided for screening for screening tissue images through the use of a two-level procedure. Referring to FIG. 12, at stage 1202, a first set of morphometric data from a tissue image for a new patient is evaluated by a model that predicts whether the tissue is cancerous or non-cancerous. At stage 1204, if the model classifies the tissue as cancerous tissue, a second set of morphometric data from the tissue image is evaluated by a model that assigns a cancer grade to the tissue (e.g., a Gleason grade for prostate tissue). The second set of morphometric feature(s) may include at least one morphometric feature not included in the first set of morphometric feature(s). For example, in the first stage, one or more image-level morphometric features from the tissue image (e.g., fractal dimension, fractal code, wavelet, and/or color channel histogram feature(s)) may be evaluated by the model that predicts whether the tissue is cancerous or non-cancerous. In the second stage, one or more object-level features, alone or in combination with image-level features, may be evaluated by the model that assigns a cancer grade to the tissue.

In one embodiment, the second set of morphometric features may be extracted from the tissue image only if the tissue is classified by the model as being cancerous (based on the first set of morphometric features). In this way, the resources of physicians, other individuals and/or automated processing equipment (e.g., equipment for extracting morphometric data from tissue images) may be conserved. For example, when object-level features are evaluated in the second stage, this may reduce the number of tissue images that require segmentation and for which the object-level features (which numbered 424 per image in the below illustrative Studies 1 and 2) must be extracted. In another embodiment, the first and second sets of morphometric features may be extracted from the tissue image at the same time.

In an embodiment, the two-level procedure shown in FIG. 12 may be applied to identify, in a whole tissue section (or other suitable size tissue section), portions of the section that are cancerous, and then further analyze those sections. For example, the tissue section may be subdivided (e.g., manually or automatically) into multiple individual portions, images may be taken of each of the portions, and each of these portions may be evaluated at stage 1202 by the model that predicts whether tissue is cancerous or non-cancerous. In another embodiment, an image of a tissue section may be subdivided into individual sub-images, each image corresponding to a particular tissue portion. Portions that are determined by the model to be cancerous may be assigned a first indicator (e.g., "1"), which may be stored in memory. Portions that are determined by the model to be non-cancerous may be assigned a second indicator (e.g., "0") for storage in memory. At stage 1204, only the portions having been assigned the first indicator may be analyzed by the predictive model that assigns a cancer grade to the tissue portion. Any suitable hardware, software, or both may be used to subdivide the tissue section (or image thereof) into individual portions, the design of which will be apparent to one of ordinary skill in the art.

Figure 13A:
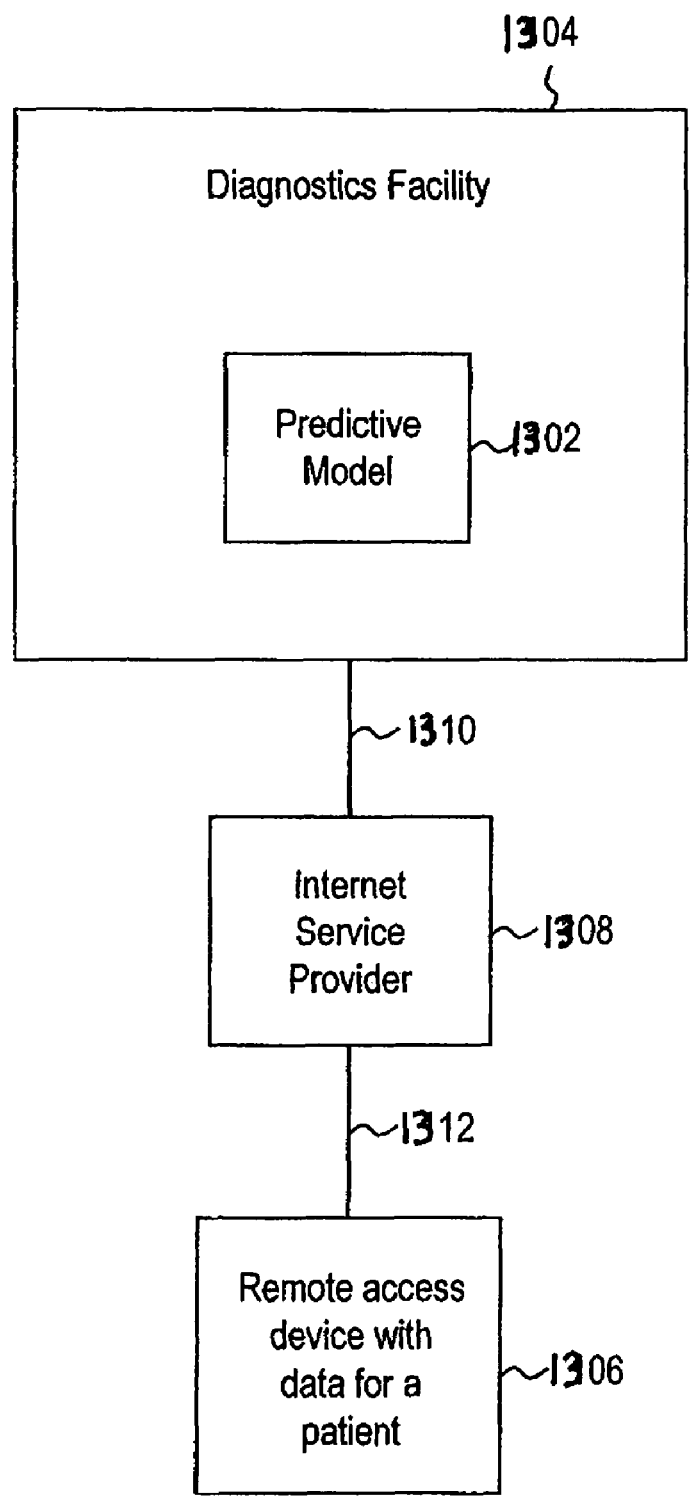

FIGS. 13(a) and 13(b) show illustrative systems that use a predictive model to make a decision as to a patient's status with respect to a medical condition (e.g., cancer/non-cancer or cancer grade). The arrangement in FIG. 13(a) may be used when, for example, a medical diagnostics lab provides support for a medical decision to a physician or other individual associated with a remote access device. The arrangement in FIG. 13(b) may be used when, for example, a test kit including the predictive model is provided for use in a facility such as a hospital, other medical facility, or other suitable location.

Referring to FIG. 13(a), predictive model 1302 is located in diagnostics facility 1304. Predictive model 1302 may include any suitable hardware, software, or combination thereof for receiving data for a patient, evaluating the data in order to make a decision as to the patient's status with respect to a medical condition, and outputting the results of the evaluation. Diagnostics facility 1304 may receive morphometric data for a patient from remote access device 1306 via Internet service provider (ISP) 1308 and communications networks 1310 and 1312, and may input the data to predictive model 1302 for evaluation. Other arrangements for receiving and evaluating data for a patient from a remote location are of course possible (e.g., via another connection such as a telephone line or through the physical mail). The remotely located physician or individual may acquire the data for the patient in any suitable manner and may use remote access device 1306 to transmit the data to diagnostics facility 1304. In some embodiments, the data for the patient may be at least partially generated by diagnostics facility 1304 or another facility. For example, diagnostics facility 1304 may receive a digitized version of an H&E stained image from remote access device 1306 or other device and may generate morphometric data including image-level morphometric data and/or object-level morphometric data for the patient based on the image. In another example, actual tissue samples may be received and processed by diagnostics facility 304 in order to generate the morphometric data. In other examples, a third party may receive an image or tissue for a new patient, generate the morphometric data based on the image or tissue, and provide the morphometric data to diagnostics facility 304. Any suitable hardware, software, or combination thereof may be used to extract the morphometric data. For example, the image processing tool described in connection with FIG. 11 may be used to extract object-level morphometric data from tissue images. With respect to image-level data, the design of suitable hardware, software, or combination thereof capable of performing the functions of image-level feature extraction described in connection with FIGS. 4 and 6-9 will be apparent to one of ordinary skill in the art. Any suitable hardware, software, or both may be used to extract the image-level data. For example, software for extracting the image-level data may be developed through the use of a commercially-available software development tool such as MATLAB by MathWorks.

Diagnostics facility 1304 may provide the results of the evaluation to a physician or individual associated with remote access device 1306 through, for example, a transmission to remote access device 1306 via ISP 1308 and communications networks 1310 and 1312 or in another manner such as the physical mail or a telephone call. The results may include a diagnostic "score" (e.g., an indication of whether the tissue for the patient is cancerous or non-cancerous or a Gleason grade for the tissue), information indicating one or more features analyzed by predictive model 1302 as being correlated with the medical condition, information indicating the sensitivity and/or specificity of the predictive model, or other suitable diagnostic information or a combination thereof.

Remote access device 1306 may be any remote device capable of transmitting and/or receiving data from diagnostics facility 1304 such as, for example, a personal computer, a wireless device such as a laptop computer, a cell phone or a personal digital assistant (PDA), or any other suitable remote access device. Multiple remote access devices 1306 may be included in the system of FIG. 13(a) (e.g., to allow a plurality of physicians or other individuals at a corresponding plurality of remote locations to communicate data with diagnostics facility 1304), although only one remote access device 1306 has been included in FIG. 13(a) to avoid over-complicating the drawing. Diagnostics facility 1304 may include a server capable of receiving and processing communications to and/or from remote access device 1306. Such a server may include a distinct component of computing hardware and/or storage, but may also be a software application or a combination of hardware and software. The server may be implemented using one or more computers.

Each of communications links 1310 and 1312 may be any suitable wired or wireless communications path or combination of paths such as, for example, a local area network, wide area network, telephone network, cable television network, intranet, or Internet. Some suitable wireless communications networks may be a global system for mobile communications (GSM) network, a time-division multiple access (TDMA) network, a code-division multiple access (CDMA) network, a Bluetooth network, or any other suitable wireless network.

FIG. 13(b) shows a system in which test kit 1322 including the predictive model of the present invention is provided for use in facility 1324, which may be a hospital, a physician's office, or other suitable location. Test kit 1322 may include any suitable hardware, software, or combination thereof (e.g., a personal computer) that is adapted to receive morphometric data for a patient including image-level and/or object-level morphometric data from a tissue image for the patient, evaluate the patient's data with a predictive model (e.g., programmed in memory of the test kit), and output the results of the evaluation. For example, test kit 1322 may include a computer readable medium encoded with computer executable instructions for performing the functions of the predictive model. The predictive model may be a predetermined model previously generated (e.g., by another system or application such as the system in FIG. 13(c)). In some embodiments, test kit 1322 may optionally include an image processing tool capable of generating data corresponding to fractal, wavelet, and/or other morphometric features from, for example, a tissue sample or image. Suitable image processing tools for object-level and image-level morphometric data are described above in connection with FIGS. 11 and 13(a). In other embodiments, test kit 1322 may receive pre-packaged data for the fractal, wavelet and/or other morphometric features as input from, for example, an input device (e.g., keyboard) or another device or location. Test kit 1322 may optionally include an input for receiving, for example, updates to the predictive model. The test kit may also optionally include an output for transmitting data, such as data useful for patient billing and/or tracking of usage, to a main facility or other suitable device or location. The billing data may include, for example, medical insurance information for a patient evaluated by the test kit (e.g., name, insurance provider, and account number). Such information may be useful when, for example, a provider of the test kit charges for the kit on a per-use basis and/or when the provider needs patients' insurance information to submit claims to insurance providers.

Figure 13C:
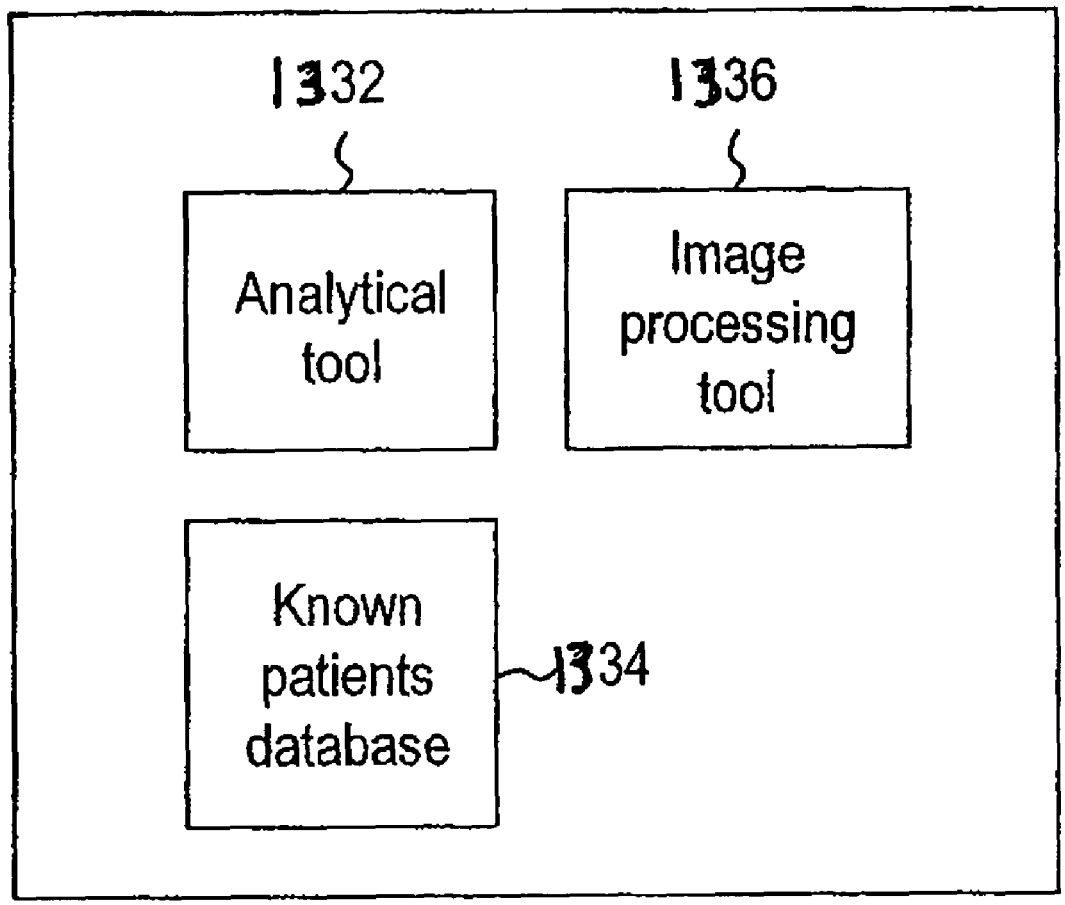
FIG. 13(c) is a block diagram of a system for generating a predictive model.

FIG. 13(c) shows an illustrative system for generating a predictive model. The system includes analytical tool 1332 and database 1334 of patients whose status with respect to the medical condition is known. Analytical tool 1332 may include any suitable hardware, software, or combination thereof for determining correlations between the data from database 1334 and a medical condition. The system in FIG. 13(c) may also include image processing tool 1336 capable of generating fractal, wavelet, and/or other morphometric data based on, for example, a digitized version of an H&E stained tissue image, an actual tissue sample, or both. Tool 1336 may generate the morphometric data for, for example, the known patients whose data is included in database 1334. Suitable image processing tools for object-level and image-level morphometric data are described above in connection with FIGS. 11 and 13(a).

Database 1334 may include any suitable patient data such as tissue images of patients, and/or image-level and/or object-level morphometric data corresponding to the images. Database 1334 may also include data indicating the status of patients with respect to a medical condition such as whether tissue corresponding to the tissue image is cancerous or not and, if cancerous, the Gleason grade for that tissue.

Illustrative Studies

Two studies were performed in which the inventors have identified various morphometric features and their respective correlations with the classification of tissue images. Namely, in the Study 1, morphometric data from tissue images for which it was known whether the corresponding tissue was cancerous or non-cancerous was used to train models to predict whether tissue for a new patient was cancerous. In the Study 2, morphometric data from tissue images for which the corresponding Gleason grades were known was used to train models to predict a Gleason grade for tissue for a new patient. The results of these studies are presented below. The inventors expect that continued experimentation and/or the use of other suitable hardware, software, or combination thereof will yield various other sets of computer-generated morphometric features (e.g., a subset of the morphometric features identified by the inventors) that may correlate with these and other medical conditions. Additionally, while these studies focused on training models with computer-generated morphometric data from tissue images only, it will be understood that other patient data such as clinical data and/or molecular data may be used in conjunction with the morphometric data described herein without departing from the scope of the present invention.

In the following studies, the sequential forward search (SFS) algorithm was used for feature selection. The SFS algorithm begins with selecting the individual feature that maximizes J. Each consequent stage of the algorithm consists of augmenting the set of already selected features with a new feature such that the resulting feature subset maximizes J. The process of adding new features is continued until J reaches a maximum. In the studies, Gaussian class-conditional distributions were assumed, linear and quadratic Gaussian classifiers were utilized, and system performance measured as classification accuracy was estimated using cross-validation [2].

In the studies, the k-fold cross-validation (CV) method was used for classifier training and feature selection, as well as classifier evaluation. CV consists of splitting the data into k equal or almost equal sets. Classifier training and feature selection is done k times, each time using the samples in k-1 sets. The resulting classifier is tested on the remaining set for classifier evaluation. The overall performance of the trained models is obtained as the mean of the accuracies over the k left-out sets. The special case k=n is referred to as the LOO method [2].

Two CV loops were used for classifier training and testing. The outer loop consisted of k-fold CV for classifier testing. For each outer CV run, an inner loop was executed for classifier training and feature selection on the training set for that CV run. The combination of the classifier and feature set which maximizes the LOO accuracy on the training set was selected as the optimal model in that CV run. The resulting classifier was tested on the left-out dataset in the outer CV loop. This process was repeated for all k left-out sets and the accuracies across the runs are averaged to obtain the overall performance of the feature set.

The tissue samples used in the studies were stained using Hematoxylin and Eosin (H&E). The images were captured and stored using the light microscope and digital camera described above in connection with FIG. 3. All images were captured under similar illumination conditions and labeled by an expert pathologist. Examples of the tissue images are shown in FIG. 1.

Study 1: Automated Cancer Diagnosis of Tissue Images

The image set used for tumor/non-tumor classification consisted of 367 images obtained from TMA cores. Of these, 218 were tumors and 149 were non-tumors. Images labeled as tumor had between 5% and 100% of their area covered by tumor. Images labeled as non-tumor included samples of PIN (Prostatic Intraepithelial Neoplasia, a precursor to cancer), prostatitis (inflammation of prostate), and normal tissue.

The image set used for tumor/non-tumor classification was randomly split into five sets of almost equal sizes to obtain a 5-fold CV estimate of the classification performance. Splitting was done such that the numbers of images per class was (almost) equal across sets. Each run of the 5-fold CV algorithm consisted of using one image set for testing the classifier trained on the remaining images sets.

For each image in the tumor/non-tumor image set, all of the image-level features (i.e., fractal dimension, fractal code, wavelet, and color channel histogram features) described in connection with FIGS. 4, 6-9 were extracted. With respect to object-level features, 48 color, structure, and texture features for each of eight histological object classes (i.e., stroma, epithelial nuclei, non-epithelial nuclei, cytoplasm, red blood cells, apoptotic (dead) cells, lumens, and artifacts) were obtained. Moreover, epithelial nuclei were divided into six subclasses based on the number of their neighbors and four subclasses based on the number of nucleoli they encompassed, and four features were obtained for each subclass. The neighborhood subclasses were the nuclei with 0, ..., 4, and more neighbors, and the nucleoli subclasses were nuclei with 0, 1, 2, and more nucleoli. The features were the number, area, mean area and the standard deviation of the mean area of the nuclei in the subclass. Overall, 8×48+4×6+4×4=424 object-level features were obtained.

Feature selection using the SFS algorithm was then performed on individual feature sets as well as the combined feature set using both linear and quadratic Gaussian classifiers. The optimal feature combination was determined as the set with the highest LOO accuracy estimate on the training set. During the feature selection experiments, it was noted that the LOO accuracy is not always a unimodal function of the number of features selected. Thus, the first peak reached in the LOO accuracy does not necessarily correspond to the optimal feature combination. In order to address this problem, the SFS algorithm was continued until 15 features were selected, and the optimal feature combination was chosen as the one that maximized the accuracy within the range of feature combinations considered. The accuracies of the feature sets obtained as the average accuracy taken over all CV test sets are shown in FIG. 14. As indicated, the object-level features (also referred to as the MAGIC™ features) together with the linear Gaussian classifier achieved the highest accuracy of 96.7% with a 95% confidence interval (CI) of ±1.8% using a median of seven features, where median was taken over the five CV runs.

To gain insight into the meaning and value of the features, the individually best features, resulting in the highest LOO accuracy on the entire dataset of 367 images, were obtained for each feature set using the linear Gaussian classifier. These features are also shown in FIG. 14. As indicated, the fractal dimension and wavelet features yielded the highest accuracy.

The best object-level (MAGIC™) and wavelet features have straightforward intuitive interpretations. The best MAGIC™ feature is the number of epithelial nuclei objects with one neighbor. This feature captures information about the invasion of the stromal tissue by epithelial cells. Large numbers of relatively isolated epithelial nuclei indicate possible malignancy. The best wavelet feature differentiates tumor and non-tumor images based on their texture coarseness. Tumor images have finer texture compared to non-tumor images, as can be seen from FIG. 1. This leads to a higher variance of coefficients in the diagonal detail subbands of the tumor images compared to non-tumor images. FIG. 14 also shows that color channel histograms are fairly effective in tumor/non-tumor classification.

Figure 15:
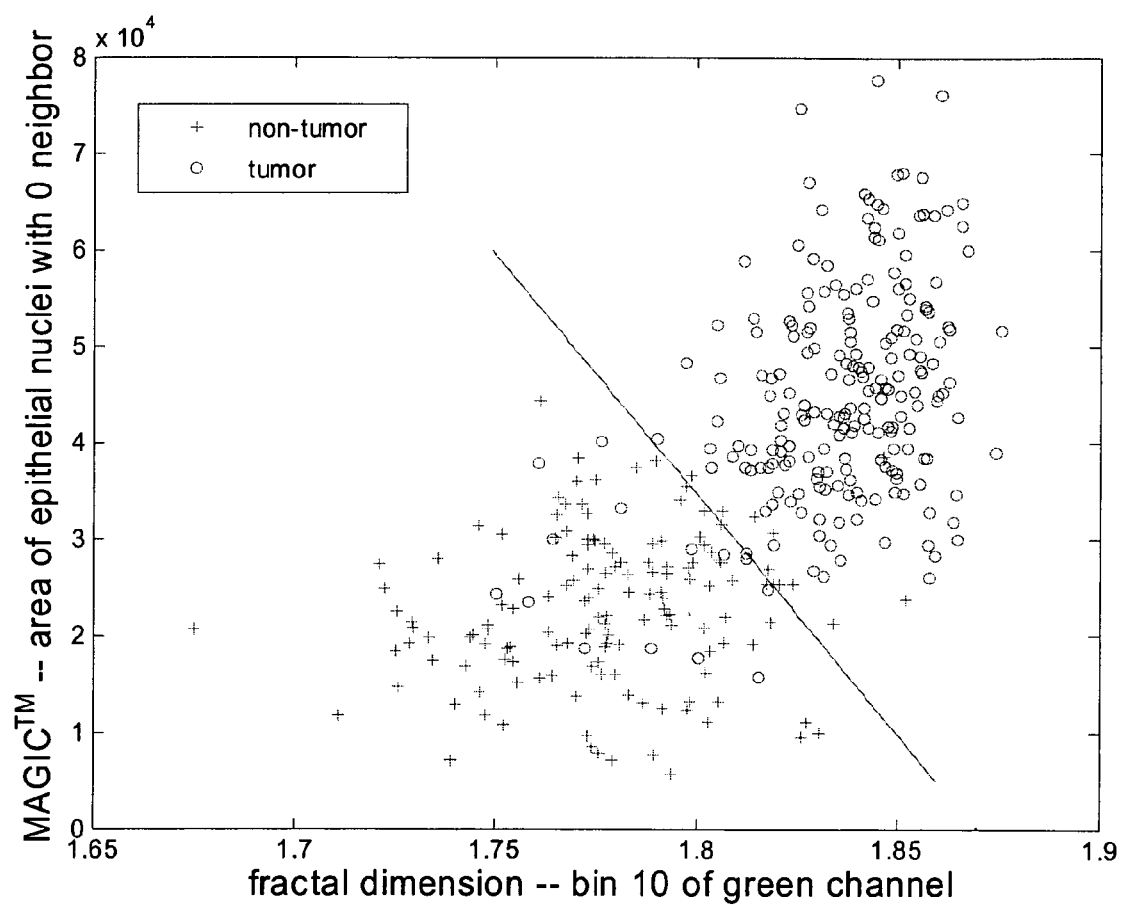
FIG. 15 is a scatterplot of samples for the best-performing two features for the study of FIG. 14, where the solid line depicts the decision boundary.

The feature space arrangement of the samples was examined using a two-dimensional scatterplot. The scatterplot was obtained for the best two features that together maximize the LOO accuracy on the entire dataset of 367 images. These two features were obtained using the SFS algorithm. The scatterplot and the corresponding linear Gaussian classifier are shown in FIG. 15. The horizontal axis is the best fractal dimension feature from FIG. 14 and the vertical axis is the number of epithelial nuclei objects that have no epithelial nuclei neighbors, where the reason that the best fractal dimension feature was selected over the best wavelet feature is merely that the SFS algorithm encountered it before the best wavelet feature. Epithelial nuclei objects that have no epithelial nuclei neighbors suggest the possible invasion of stromal tissue by epithelial cells via counting the number of isolated epithelial nuclei. As the scatterplot confirms, larger numbers of epithelial nuclei with no neighboring epithelial nuclei correspond to cancerous tissue.

Study 2: Automated Gleason Grading of Tissue Images

The image set used for Gleason grading consisted of 268 images obtained from whole tissue sections. Of these, 175 images belonged to grades 2 and 3, which were referred to as "low-grade", and 93 belonged to grades 4 and 5, referred to as "high-grade." All images in this set had at least 80% of their area covered by tumor.

Similar to the tumor/non-tumor classification problem, the Gleason grading image set was randomly split into five sets of (almost) equal sizes to conduct 5-fold CV. For each image, the image-level and object-level features described in above in connection with Study 1 were extracted. Feature selection was performed using the SFS procedure described above. FIG. 16 shows the accuracy of the selected feature subsets. A subset of the combined feature set classified using the linear Gaussian classifier achieved the highest accuracy of 78.7% with a 95% CI of ±4.9% using a median of seven features.

FIG. 16 also shows the individually best features for each feature set obtained on the dataset of 268 images using SFS, LOO, and the linear Gaussian classifier. The best overall feature is the object-level feature of standard deviation of the border lengths of lumen objects. This feature can be interpreted in view of the larger variation in the size of lumens in low-grade tumor images compared to that in high-grade tumor images, as FIG. 1 suggests. The best wavelet feature can be viewed as a descriptor of texture coarseness. The coarser the texture is, the larger the variance of the approximation subband becomes. This feature captures the difference between the more coarsely textured low-grade tumor and the more finely textured high-grade tumor.

Although FIG. 16 also indicates that the color channel histograms conveyed little information about the Gleason grade (which is based moreso on structural patterns than colors), it is believed that color will continue to play an important role in tissue classification.

Figure 17:
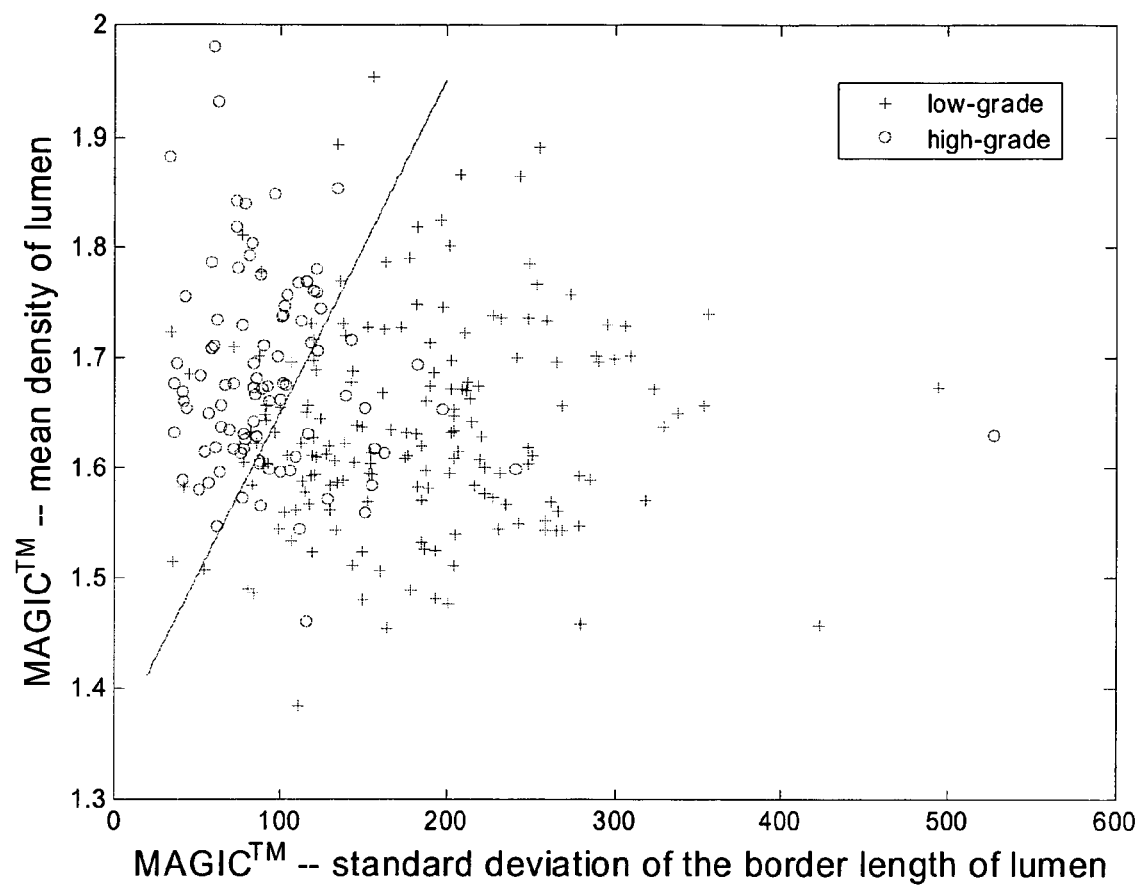
FIG. 17 is a scatterplot of samples for the best-performing two features for the study of FIG. 16, where the solid line depicts the decision boundary.

The scatterplot for the best two features, obtained on the entire dataset of 268 images using SFS, LOO, and the linear Gaussian classifier, is given in FIG. 17. The horizontal axis is the best object-level (MAGIC™) feature from FIG. 16 and the vertical axis is the mean density of lumens. Density d of an object is a measure of its compactness and is defined as the ratio of the square root of its area s to its radius, i.e., $d=\sqrt{s}/(1+\sqrt{var(X)}+\sqrt{var(Y)})$, where var(.) denotes variance, and X and Y are the x- and y- coordinates of all pixels forming the object, respectively. Note that the closer an object resembles a square, the higher its d value is. Although not immediately obvious from FIG. 1, lumens in high-grade tumors have slightly higher d values than lumens in low-grade tumors.

Summary of Studies 1 and 2

Studies 1 and 2 focused on features for automated prostate cancer diagnosis and Gleason grading of histological images. An automated system brings objectivity and reproducibility to cancer diagnosis and grading and may contribute to improvement in patient's prognosis. An advantage of the studies presented herein over previous studies is that they addressed diagnosis and grading within a unified framework. Moreover, features were considered that describe the color, morphometric, and texture characteristics of the image at the global and histological object levels, whereas previous studies only considered one or two of the above features types.

Global features describing the color and texture characteristics of the entire image were color channel histograms, fractal dimension features, fractal code features, and wavelet features.

Object features characterizing the color, structural, and texture characteristics of segmented histological objects were obtained using the MAGIC™ system. The object-level features included shape features as well as features describing the spatial relationships between histological objects.

The linear and quadratic Gaussian classifiers were applied to a subset of features obtained via the SFS algorithm to classify images into the tumor/non-tumor classes and tumor images into the low-/high-grade classes. On cancer diagnosis, a 5-fold CV classification accuracy of 96.7% was achieved with the object-level (MAGIC™) feature set and the linear Gaussian classifier. The most effective features for this task were those that characterize the spatial relationship between epithelial cells, which indicate the invasion of epithelial cells into the stroma tissue, and the tissue texture coarseness. On Gleason grading, a 5-fold CV classification accuracy of 78.7% was achieved using the combined feature set and the linear Gaussian classifier. Among the most discriminative features in this problem were descriptors characterizing lumen shape and tissue texture coarseness.

An interesting commonality between the two classification tasks is that, according to Studies 1 and 2, both of these tasks can be addressed with fairly good accuracy using texture features alone. Features that characterize texture coarseness perform particularly well in both tasks.

Additional Embodiments

Thus it is seen that systems and methods are provided for automated diagnosis and grading of tissue images. Although particular embodiments have been disclosed herein in detail, this has been done by way of example for purposes of illustration only, and is not intended to be limiting with respect to the scope of the appended claims, which follow. In particular, it is contemplated by the inventors that various substitutions, alterations, and modifications may be made without departing from the spirit and scope of the invention as defined by the claims. Other aspects, advantages, and modifications are considered to be within the scope of the following claims. The claims presented are representative of the inventions disclosed herein. Other, unclaimed inventions are also contemplated. The inventors reserve the right to pursue such inventions in later claims.

Insofar as embodiments of the invention described above are implementable, at least in part, using a computer system, it will be appreciated that a computer program for implementing at least part of the described methods and/or the described systems is envisaged as an aspect of the present invention. The computer system may be any suitable apparatus, system or device. For example, the computer system may be a programmable data processing apparatus, a general purpose computer, a Digital Signal Processor or a microprocessor. The computer program may be embodied as source code and undergo compilation for implementation on a computer, or may be embodied as object code, for example.

It is also conceivable that some or all of the functionality ascribed to the computer program or computer system aforementioned may be implemented in hardware, for example by means of one or more application specific integrated circuits. Suitably, the computer program can be stored on a carrier medium in computer usable form, which is also envisaged as an aspect of the present invention. For example, the carrier medium may be solid-state memory, optical or magneto-optical memory such as a readable and/or writable disk for example a compact disk (CD) or a digital versatile disk (DVD), or magnetic memory such as disc or tape, and the computer system can utilize the program to configure it for operation. The computer program may also be supplied from a remote source embodied in a carrier medium such as an electronic signal, including a radio frequency carrier wave or an optical carrier wave.

REFERENCES

The following references referred to in the foregoing description are all hereby incorporated by reference herein in their entireties:

[1] J. Diamond, N. Anderson, P. Bartels, R. Montironi, and P. Hamilton, "The use of morphological characteristics and texture analysis in the identification of tissue composition in prostatic neoplasia," *Human Pathology*, vol. 35, pp. 1121-1131, 2004.

[2] M. A. Roula, J. Diamond, A. Bouridane, P. Miller, and A. Amira, "A multispectral computer vision system for automatic grading of prostatic neoplasia," in *Proc. Proc. IEEE Int. Symp. Biomed. Imaging*, Washington, D.C., 2002, pp. 193-196.

[3] R. Stotzka, R. Manner, P. H. Bartels, and D. Tompson, "A hybrid neural and statistical classifier system for histopathologic grading of prostate lesions," *Anal. Quant. Cytol. Histol.*, vol. 17, pp. 204-218, 1995.

[4] Y. Smith, G. Zajieck, M. Werman, G. Pizov, and Y. Sherman, "Similarity measurement method for the classification of architecturally differentiated images," *Comp. Biomed. Res.*, vol. 32, pp. 1-12, 1999.

[5] A. W. Wetzel, R. Crowley, S. J. Kim, R. Dawson, L. Zheng, Y. M. Joo, Y. Yagi, J. Gilbertson, C. Gadd, D. W. Deerfield and M. J. Becich, "Evaluation of prostate tumor grades by content-based image retrieval," in *Proc. SPIE AIPR Workshop on Advances in Computer-Assisted Recognition*, vol. 3584, Washington, D.C., 1999, pp. 244-252.

[6] K. Jafari-Khouzani and H. Soltanian-Zadeh, "Multiwavelet grading of pathological images of prostate," *IEEE Trans. Biomed. Eng.*, vol. 50, pp. 697-704, 2003.

[7] R. C. Gonzales and R. E. Woods, *Digital Image Processing*. Addison-Wesley, New York, 1992.

[8] Definiens Cellenger Architecture: A Technical Review, April 2004.

[9] K. Fukunaga, *Introduction to Statistical Pattern Recognition,* 2nd ed. Academic, New York, 1990.

[10] R. O. Duda, R. E. Hart, and D. G. Stork, *Pattern Classification,* 2nd ed. Wiley, New York, 2001.

[11] G. Landini "Applications of fractal geometry in pathology," in *Fractal Geometry in Biological Systems: An Analytical Approach*, P. M. Iannaccone and M. Khokha, Eds. CRC Press, Boca Raton, Fla., 1996, pp.205-246.

[12] N. Lu, *Fractal Imaging*. Academic, San Diego, Calif., 1997.

[13] A. E. Jacquin, "Fractal image coding: A review," *Proc. IEEE*, vol. 81, pp. 1451-1465, 1993.

[14] A. Sloan, "Retrieving database contents by image recognition: New fractal power," *Advanced Imaging*, vol. 5, pp. 26-30, 1994.

[15] B. A. M. Schouten and P. M. de Zeeuw, "Feature extraction using fractal codes," in *Proc. Int. Conf. Visual Information and Information Systems*, Amsterdam, 1999, pp. 483-492.

[16] A. Laine and J. Fan, "Texture classification by wavelet packet signatures," *IEEE Trans. Pattern Anal. Machine Intell.*, vol. 15, pp.1186-1191, 1993.

[17] I. Daubechies, *Ten Lectures on Wavelets*. SIAM, Philadelphia, Pa., 1992.

[18] Baatz M. and Schäpe A., "Multiresolution Segmentation—An Optimization Approach for High Quality Multiscale Image Segmentation," In *Angewandte Geographische Informationsverarbeitung* XII, Strobl, J., Blaschke, T., Griesebner, G. (eds.), Wichmann-Verlag, Heidelberg, 12-23, 2000.

We claim:

1. An apparatus for evaluating a tissue image for a medical condition, the apparatus comprising:
   a model predictive of the medical condition, wherein the model is based on one or more fractal dimension features from one or more binary images, each binary image corresponding to a particular color channel of the tissue image, said model defining a relationship between the expression of said one or more fractal dimension features and the medical condition, wherein the model is configured to:
      receive data identifying an expression of said one or more fractal dimension features within the tissue image; and
      evaluate said data according to the relationship defined by the model to produce a value indicative of at least one of the presence, absence, or aggressiveness of the medical condition.

2. The apparatus of claim 1, further comprising an image processing tool configured to extract the one or more fractal dimension features from the tissue image, wherein said image processing tool is configured to:
   threshold the tissue image at one or more fixed, equally-spaced thresholds in one or more of its red, green, and blue (RGB) color channels to obtain one or more binary images; and
   compute a fractal dimension value $\gamma_k^i$ for each of the one or more binary images.

3. The apparatus of claim 1, wherein the model predicts whether the tissue in the tissue image is cancerous or non-cancerous.

4. The apparatus of claim 1, wherein the model predicts a cancer grade for the tissue in the tissue image.

5. The apparatus of claim 4, wherein the cancer grade comprises a Gleason grade.

6. The apparatus of claim 1, wherein the model is further based on one or more additional features, said model further defining a relationship between the expression of said one or more additional features and the medical condition, wherein said model is further configured to receive additional data identifying an expression of said one or more additional features and to evaluate said additional data according to the relationships defined by the model to produce said value indicative of at least one of the presence, absence, or aggressiveness of the medical condition.

7. An apparatus for evaluating a tissue image for a medical condition, the apparatus comprising:
   a model predictive of the medical condition, wherein the model is based on one or more fractal code features from the group of fractal code features consisting of a mean square error (MSE) between a domain block and a range block, a shift parameter of an affine transform, a scaling parameter of an affine transform, a shuffling transform, and a Euclidean distance between a domain block and a range block in an image plane, said model defining a relationship between the expression of said one or more fractal code features and the medical condition, wherein the model is configured to:
      receive data identifying an expression of said one or more fractal code features within the tissue image; and
      evaluate said data according to the relationship defined by the model to produce a value indicative of at least one of the presence, absence, or aggressiveness of the medical condition.

8. The apparatus of claim 7, further comprising an image processing tool configured to extract the one or more fractal code features from the tissue image, wherein the image processing tool is configured to:
   partition the tissue image into non-overlapping blocks of two different sizes: range blocks $B_j$ and domain blocks $\overline{A}_i$; and
   search for a domain block $\overline{A}_i$ and a transformation $T_i$ such that the transformed domain block $T_i\overline{A}_i$ is an approximation of $B_j$,
   wherein one or more characteristics of the transformation comprise the one or more fractal code features.

9. The apparatus of claim 8, wherein said image processing tool is configured to search for a domain block $\overline{A}_i$ and a transformation $T_i$ such that a mean square error (MSE) between the domain block and range block is minimized.

10. The apparatus of claim 7, wherein the model is further based on one or more additional features, said model further defining a relationship between the expression of said one or more additional features and the medical condition, wherein said model is further configured to receive additional data identifying an expression of said one or more additional features and to evaluate said additional data according to the relationships defined by the model to produce said value indicative of at least one of the presence, absence, or aggressiveness of the medical condition.

11. An apparatus for evaluating a tissue image for a medical condition, the apparatus comprising:
   a model predictive of the medical condition, wherein the model is based on one or more wavelet features comprising one or more measurements of variance of wavelet coefficients for one or more wavelet representation subbands, said model defining a relationship between the expression of said one or more measurements of variance of wavelet coefficients and the medical condition, wherein the model is configured to:
receive data identifying an expression of said one or more measurements of variance of wavelet coefficients within the tissue image; and
evaluate said data according to the relationship defined by the model to produce a value indicative of at least one of the presence, absence, or aggressiveness of the medical condition.

12. The apparatus of claim 11, further comprising an image processing tool configured to extract the one or more wavelet features from the tissue image, wherein the image processing tool is configured to:
generate a wavelet representation of the tissue image; and
compute the variance of the wavelet subband coefficients for at least one of the wavelet representation subbands.

13. The apparatus of claim 11, wherein the one or more wavelet features comprises one or more scalar wavelet transform features.

14. The apparatus of claim 11, wherein the model is further based on one or more additional features, said model further defining a relationship between the expression of said one or more additional features and the medical condition, wherein said model is further configured to receive additional data identifying an expression of said one or more additional features and to evaluate said additional data according to the relationships defined by the model to produce said value indicative of at least one of the presence, absence, or aggressiveness of the medical condition.

15. An apparatus for evaluating a tissue image for a medical condition, the apparatus comprising:
a model predictive of the medical condition, wherein the model is based on one or more color channel histogram features comprising one or more pixel counts, each pixel count corresponding to an intensity of a particular color channel of the tissue image, said model defining a relationship between the expression of said one or more color histogram features and the medical condition, wherein the model is configured to:
receive data identifying an expression of said one or more color histogram features within the tissue image; and
evaluate said data according to the relationship defined by the model to produce a value indicative of at least one of the presence, absence, or aggressiveness of the medical condition.

16. The apparatus of claim 15, further comprising an image processing tool configured to extract the one or more channel histogram features from the tissue image, wherein said image processing tool is configured to:
separate the tissue image into one or more of its red, green, and blue (RGB) color channels to produce one or more color channel images;
separate one or more of the color channel images into bins representing levels of color intensity; and
compute a pixel count for one or more of the bins.

17. The apparatus of claim 15, wherein the model is further based on one or more additional features, said model further defining a relationship between the expression of said one or more additional features and the medical condition, wherein said model is further configured to receive additional data identifying an expression of said one or more additional features and to evaluate said additional data according to the relationships defined by the model to produce said value indicative of at least one of the presence, absence, or aggressiveness of the medical condition.

18. A computer readable storage medium comprising computer executable instructions recorded thereon for performing the method comprising:
receiving data identifying an expression of one or more fractal dimension features from one or more binary images of a tissue image, each binary image corresponding to a particular color channel of the tissue image; and
evaluating said data with a model predictive of a medical condition to produce a value indicative of at least one of the presence, absence, or aggressiveness of the medical condition, wherein the model is based on said one or more fractal dimension features, said model defining a relationship between the expression of said one or more fractal dimension features and the medical condition wherein said evaluating said data comprises evaluating said data according to the relationship defined by the model.

19. The computer readable storage medium of claim 18, wherein the model is further based on one or more additional features, said model further defining a relationship between the expression of said one or more additional features and the medical condition, wherein said computer executable instructions further comprise computer executable instructions for receiving additional data identifying an expression of said one or more additional features and evaluating said additional data according to the relationships defined by the model to produce said value indicative of at least one of the presence, absence, or aggressiveness of the medical condition.

20. A computer readable storage medium comprising computer executable instructions recorded thereon for performing the method comprising:
receiving data identifying for a tissue image an expression of one or more fractal code features from the group of fractal code features consisting of a mean square error (MSE) between a domain block and a range block, a shift parameter of an affine transform, a scaling parameter of an affine transform, a shuffling transform, and a Euclidean distance between a domain block and a range block in an image plane; and
evaluating said data with a model predictive of a medical condition to produce a value indicative of at least one of the presence, absence, or aggressiveness of the medical condition, wherein the model is based on said one or more fractal code features, said model defining a relationship between the expression of said one or more fractal code features and the medical condition wherein said evaluating said data comprises evaluating said data according to the relationship defined by the model.

21. The computer readable storage medium of claim 20, wherein the model is further based on one or more additional features, said model further defining a relationship between the expression of said one or more additional features and the medical condition, wherein said computer executable instructions further comprise computer executable instructions for receiving additional data identifying an expression of said one or more additional features and evaluating said additional data according to the relationships defined by the model to produce said value indicative of at least one of the presence, absence, or aggressiveness of the medical condition.

22. A computer readable storage medium comprising computer executable instructions recorded thereon for performing the method comprising:
receiving data identifying for a tissue image an expression of one or more wavelet features comprising one or more measurements of variance of wavelet coefficients for one or more wavelet representation subbands; and evaluating said data with a model predictive of a medical condition to produce a value indicative of at least one of the presence, absence, or aggressiveness of the medical condition, wherein the model is based on said one or more wavelet features, said model defining a relationship between the expression of said one or more wavelet features and the medical condition wherein said evaluating said data comprises evaluating said data according to the relationship defined by the model.

23. The computer readable storage medium of claim 22, wherein the model is further based on one or more additional features, said model further defining a relationship between the expression of said one or more additional features and the medical condition, wherein said computer executable instructions further comprise computer executable instructions for receiving additional data identifying an expression of said one or more additional features and evaluating said additional data according to the relationships defined by the model to produce said value indicative of at least one of the presence, absence, or aggressiveness of the medical condition.

24. A computer readable storage medium comprising computer executable instructions recorded thereon for performing the method comprising:
   receiving data identifying for a tissue image an expression of one or more color channel histogram features comprising one or more pixel counts, each pixel count corresponding to an intensity of a particular color channel of the tissue image; and
   evaluating said data with a model predictive of a medical condition to produce a value indicative of at least one of the presence, absence, or aggressiveness of the medical condition, wherein the model is based on said one or more color channel histogram features, said model defining a relationship between the expression of said one or more color channel histogram features and the medical condition wherein said evaluating said data comprises evaluating said data according to the relationship defined by the model.

25. The computer readable storage medium of claim 24, wherein the model is further based on one or more additional features, said model further defining a relationship between the expression of said one or more additional features and the medical condition, wherein said computer executable instructions further comprise computer executable instructions for receiving additional data identifying an expression of said one or more additional features and evaluating said additional data according to the relationships defined by the model to produce said value indicative of at least one of the presence, absence, or aggressiveness of the medical condition.

* * * * *